(12) United States Patent
Kato et al.

(10) Patent No.: US 7,746,751 B2
(45) Date of Patent: Jun. 29, 2010

(54) RECORDING MEDIUM, DATA RECORDING DEVICE AND METHOD, DATA REPRODUCING DEVICE AND METHOD, PROGRAM, AND RECORDING MEDIUM

(75) Inventors: Motoki Kato, Kanagawa (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 10/513,337

(22) PCT Filed: Mar. 12, 2004

(86) PCT No.: PCT/JP2004/003291

§ 371 (c)(1),
(2), (4) Date: Nov. 12, 2004

(87) PCT Pub. No.: WO2004/084215

PCT Pub. Date: Sep. 30, 2004

(65) Prior Publication Data

US 2006/0164927 A1 Jul. 27, 2006

(30) Foreign Application Priority Data

Mar. 18, 2003 (JP) .............................. 2003-074095

(51) Int. Cl.
*G11B 20/10* (2006.01)
(52) U.S. Cl. ............... 369/59.27; 369/47.16; 369/59.24; 369/59.26
(58) Field of Classification Search ........................ None
See application file for complete search history.

(56) References Cited

U.S. PATENT DOCUMENTS

| 5,987,417 | A | * | 11/1999 | Heo et al. | .................... 704/500 |
| 6,014,495 | A | * | 1/2000 | Moriyama et al. | ............ 386/96 |
| 6,018,611 | A | * | 1/2000 | Nogami et al. | ................ 386/52 |
| 6,025,946 | A | * | 2/2000 | Miyamori et al. | ........... 398/185 |
| 6,580,671 | B1 | * | 6/2003 | Otomo et al. | ............ 369/47.15 |
| 2003/0133699 | A1 | * | 7/2003 | Ando et al. | .................... 386/95 |
| 2003/0169782 | A1 | * | 9/2003 | Ichimura | .................... 370/535 |

FOREIGN PATENT DOCUMENTS

JP 2000-11546 1/2000

\* cited by examiner

*Primary Examiner*—Christopher R Lamb
(74) *Attorney, Agent, or Firm*—Oblon, Spivak, McClelland, Maier & Neustadt, L.L.P.

(57) ABSTRACT

The present invention enables audio data to be recorded or played back more easily. LPCM samples from an LPCM sample 301-1 of a first channel to an LPCM sample 304-1 of a fourth channel in audio data are combined in order to generate a GOLS 310-1. An even number of GOLS are combined to generate an audio frame. Header information is added to the audio frame to generate an audio PES packet, which is multiplexed with a video PES packet and recorded onto a recording medium. As a result, the number of bits of the audio frame is an integral multiple of 32. This increases an affinity with a recording and playback apparatus.

12 Claims, 29 Drawing Sheets

FIG. 5

| Syntax | No. of bits | Mnemonics |
|---|---|---|
| LPCM_audio_data_payload () { | | |
|     LPCM_audio_frame | | |
| } | | |

FIG. 10

| | NO. OF GOLS | NO. OF SAMPLE BITS | NO. OF CHANNELS | LPCM_audio_frame DATA SIZE (BYTE) | LPCM_audio_frame DATA SIZE (BIT) | DATA SIZE /32b |
|---|---|---|---|---|---|---|
| 0 | | | | | | |
| 1 | 2 | 16 | 2 | 8 | 64 | 2 |
| 2 | 2 | 16 | 4 | 16 | 128 | 4 |
| 3 | 2 | 16 | 6 | 24 | 192 | 6 |
| 4 | 2 | 16 | 8 | 32 | 256 | 8 |
| 5 | 2 | 24 | 2 | 12 | 96 | 3 |
| 6 | 2 | 24 | 4 | 24 | 192 | 6 |
| 7 | 2 | 24 | 6 | 36 | 288 | 9 |
| 8 | 2 | 24 | 8 | 48 | 384 | 12 |
| 9 | 4 | 16 | 2 | 16 | 128 | 4 |
| 10 | 4 | 16 | 4 | 32 | 256 | 8 |
| 11 | 4 | 16 | 6 | 48 | 384 | 12 |
| 12 | 4 | 16 | 8 | 64 | 512 | 16 |
| 13 | 4 | 24 | 2 | 24 | 192 | 6 |
| 14 | 4 | 24 | 4 | 48 | 384 | 12 |
| 15 | 4 | 24 | 6 | 72 | 576 | 18 |
| 16 | 4 | 24 | 8 | 96 | 768 | 24 |

FIG. 11

| sampling_frequency | bits_per_sample | number of channels | audio_data_payload_size [bytes] |
|---|---|---|---|
| 48kHz | 16-bit | 2 | 960 |
| | | 4 | 1920 |
| | | 6 | 2880 |
| | | 8 | 3840 |
| | 20-bit/24-bit | 2 | 1440 |
| | | 4 | 2880 |
| | | 6 | 4320 |
| | | 8 | 5760 |
| 96kHz | 16-bit | 2 | 1920 |
| | | 4 | 3840 |
| | | 6 | 5760 |
| | | 8 | 7680 |
| | 20-bit/24-bit | 2 | 2880 |
| | | 4 | 5760 |
| | | 6 | 8640 |
| | | 8 | 11520 |

FIG. 12

| Syntax | No. of bits | Mnemonics |
|---|---|---|
| LPCM_audio_data_header () { | | |
| audio_data_payload_size | 16 | uimsbf |
| channel_assignment | 4 | bslbf |
| sampling_frequency | 4 | uimsbf |
| bits_per_sample | 2 | uimsbf |
| start_flag | 1 | bslbf |
| reserved_for_word_align | 5 | bslbf |
| } | | |

FIG. 13

| Value | number of channel | channel configuration | channel number |||||||||
|---|---|---|---|---|---|---|---|---|---|---|
| | | | 1 | 2 | 3 | 4 | 5 | 6 | 7 | 8 |
| 0 | - | reserved | | | | | | | | |
| 1 | 2ch | mono | M | X | | | | | | |
| 2 | | dual mono | M | M | | | | | | |
| 3 | | stereo | L | R | | | | | | |
| 4 | 4ch | L, C, R (3/0) | L | R | C | X | | | | |
| 5 | | L, R, S (2/1) | L | R | S | X | | | | |
| 6 | | L, C, R, S (3/1) | L | R | C | S | | | | |
| 7 | | L, R, LS, RS (2/2) | L | R | LS | LS | | | | |
| 8 | 6ch | L, C, R, LS, RS (3/2) | L | R | C | LS | RS | X | | |
| 9 | | L, C, R, LS, RS, lfe (3/2+lfe) | L | R | C | LS | RS | lfe | | |
| 10 | 8ch | L, C, R, LS, CS1, CS2, RS (3/4) | L | R | C | LS | CS1 | CS2 | RS | X |
| 11 | | L, C, R, LS, CS1, CS2, RS, lfe (3/4+lfe) | L | R | C | LS | CS1 | CS2 | RS | lfe |
| 12-15 | - | reserved | | | | | | | | |

FIG. 15

| sampling_frequency | Meaning |
|---|---|
| 0 | reserved |
| 1 | 48kHz |
| 2 | 96kHz |
| 3-15 | reserved |

FIG. 16

| Value | Description |
|---|---|
| 0 | reserved |
| 1 | 16 bits/sample |
| 2 | 20 bits/sample |
| 3 | 24 bits/sample |

RECORDING MEDIUM, DATA RECORDING DEVICE AND METHOD, DATA REPRODUCING DEVICE AND METHOD, PROGRAM, AND RECORDING MEDIUM

TECHNICAL FIELD

The present invention relates to a recording medium, a data recording apparatus and method, a data playback apparatus and method, a program, and a recording medium. In particular, the present invention relates to a recording medium, a data recording apparatus and method, a data playback apparatus and method, a program, and a recording medium for enabling audio data to be recorded or played back more easily.

BACKGROUND ART

In Japanese Unexamined Patent Application Publication No. 9-251723, a method for recording the MSB-end 16 bits and the remaining LSB-end bits of a sample separately from each other is disclosed as a method for recording audio data on DVDs. FIG. 1 is a diagram showing the structure of audio data according to this method. For audio data 43 of data 11 recorded on a DVD, compressed audio data is recorded in some cases and uncompressed audio data is recorded in other cases. As the uncompressed audio data, the audio data 43 encoded by a method called a linear PCM (Pulse Code Modulation) method is recorded. The audio data 43 based on the linear PCM method includes a sample quantized into 24 bits.

In recording the audio data 43 by the linear PCM method onto a DVD, one item of the audio data 43 (audio pack) includes a start code indicating the start of the audio pack and a pack header 64 at the beginning; a packet header 65 including identification information indicating that data included in the relevant audio pack is the audio data 43; additional information AD which is information regarding the audio data 43 included in the relevant audio pack; and a plurality of audio frames AF which are units of a constant playback time for the audio data 43 included in the relevant audio pack AP.

As the additional information AD, information regarding the number of sample bits (24 bits) for sampling the audio data 43 by the linear PCM method, the sampling frequency at that time, and the number of channels included in the relevant audio data 43, etc. is described.

In the audio data 43 for each channel which has been sampled with a number of sample bits of 24, one sample block SPB includes one high-order data block UB including two items of high-order bit data 66 each defining high-order (MSB-end) 16 bits and one low-order data block DB including two items of low-order bit data 67 each defining low-order (LSB-end) 8 bits. One audio frame AF is defined by linking as many relevant sample blocks SPB as corresponding to the above-described constant playback time.

Furthermore, two items of the high-order bit data 66 included in the high-order data block UB include high-order bit data 66A (indicated by "$S_{2n}$" in the figure) of high-order 16 bits which has been sampled with the timing of even-number-th sampling in relation to the timing of sampling for linear PCM and high-order bit data 66B (indicated by "$S_{2n+1}$" in the figure) of high-order 16 bits which has been sampled with the timing of odd-number-th sampling in relation to the timing of sampling for linear PCM.

In addition, two items of the low-order bit data 67 included in the low-order data block DB include low-order bit data 67A (indicated by "$e_{2n}$" in the figure) of low-order 8 bits corresponding to the high-order bit data 66A in relation to the timing of sampling for linear PCM and low-order bit data 67B (indicated by "$e_{2n+1}$" in the figure) of low-order 8 bits corresponding to the high-order bit data 66B in relation to the timing of sampling for linear PCM. Numbers in parentheses in the high-order bit data 66 and the low-order bit data 67 indicate the number of bits for the respective item of data.

The high-order bit data 66A and the low-order bit data 67A define 24-bit audio data 43 which has been sampled with the timing of even-number-th sampling, and furthermore, the high-order bit data 66B and the low-order bit data 67B define 24-bit audio data 43 which has been sampled with the timing of odd-number-th sampling. Thus, when data is to be played back, the high-order bit data 66A and the low-order bit data 67A are combined for playback, and similarly, the high-order bit data 66B and the low-order bit data 67B are combined for playback.

Furthermore, if four channels "A" to "D" are included, the high-order bit data 66 and low-order bit data 67 includes channel high-order bit data 68 and channel low-order bit data 69 for each channel. In the known art, however, the MSB-end bit data and the LSB-end bit data are recorded separately from each other, and therefore when data is to be played back, the MSB-end bit data and the LSB-end bit data need to be combined. This introduces a problem in that processing by a recording and playback apparatus becomes complicated.

DISCLOSURE OF INVENTION

In view of the problem described above, the present invention is intended to enable audio data to be recorded or played back more easily.

A first recording medium according to the invention has sampled audio data recorded in a data area thereof such that the audio data is readable by an information processing apparatus. Audio data recorded in the data area is generated by generating a series of samples by arranging samples of the audio data which are sampled with the same timing for a plurality of channels in a predetermined order; generating an audio frame by combining an even number of the series of the samples; generating an element packet by adding header information indicating a channel configuration, the number of sample bits, and a sampling period to the audio frame; and splitting the element packet into transmission packets composed of a predetermined number of bits.

If the number of the channels is an odd number, a pseudo sample with the same number of bits as those of the samples and a predetermined pattern of the bits may be inserted after the sample which is sampled for the last channel of the plurality of channels when the series of the samples is to be generated.

The number of bits of the samples is 16, 20, or 24, and if the number of bits of the samples is 20, a predetermined pattern of 4 bits may be added to the samples.

The samples may be samples of audio data which are sampled by a linear PCM method.

The header information of the element packet may further include track head information.

A first data recording apparatus according to the present invention records sampled audio data or video data onto a recording medium readable by an information processing apparatus. The first data recording apparatus includes data analyzing means for analyzing input audio data; series-of-samples generating means for generating a series of samples by arranging samples of the audio data which are sampled with the same timing for a plurality of channels in a predetermined order on the basis of an analysis result by the analyzing means; element-packet generating means for generating an element packet by generating an audio frame by combining an even number of the series of the samples generated by the series-of-samples generating means and by adding header information indicating a channel configuration, the number of sample bits, and a sampling period to the audio frame; and transmission-packet generating means for generating a transmission packet by splitting the element packet generated by the element-packet generating means into transmission packets composed of a predetermined number of bits.

The series-of-samples generating means may include sample-inserting means for inserting a pseudo sample with the same number of bits as those of the samples and a predetermined pattern of the bits after the sample which is sampled for the last channel of the plurality of channels, if the number of channels is determined to be an odd number by the analyzing means.

The analyzing means may include sample-converting means for adding a predetermined pattern of 4 bits to the samples if the number of bits of the samples is 20.

The samples may be samples of audio data which are sampled by a linear PCM method.

The element-packet generating means may generate the element packet by storing track head information in the header information of the element packet.

A first data recording method according to the present invention relates to a data recording apparatus for recording sampled audio data or video data onto a recording medium readable by an information processing apparatus. The first data recording method includes a data-analyzing step of analyzing input audio data; a series-of-samples generating step of generating a series of samples by arranging samples of the audio data which are sampled with the same timing for a plurality of channels in a predetermined order on the basis of an analysis result in the analyzing step; an element-packet generating step of generating an element packet by generating an audio frame by combining an even number of the series of the samples generated in the series-of-samples generating step and by adding header information indicating a channel configuration, the number of sample bits, and a sampling period to the audio frame; and a transmission-packet generating step of generating a transmission packet by splitting the element packet generated in the element-packet generating step into transmission packets composed of a predetermined number of bits.

A first program according to the present invention relates to a data recording apparatus for recording sampled audio data or video data onto a recording medium readable by an information processing apparatus. The first program enables a computer to execute a data-analysis controlling step of controlling the analysis of input audio data; a sample-series-generation controlling step of controlling the generation of a series of samples by arranging samples of the audio data which are sampled with the same timing for a plurality of channels in a predetermined order on the basis of an analysis result in the analysis controlling step; an element-packet-generation controlling step of controlling the generation of an element packet by generating an audio frame by combining an even number of the series of the samples generated in the sample-series-generation controlling step and by adding header information indicating a channel configuration, the number of sample bits, and a sampling period to the audio frame; and a transmission-packet-generation controlling step of controlling the generation of a transmission packet by splitting the element packet generated in the element-packet-generation controlling step into transmission packets composed of a predetermined number of bits.

A second recording medium according to the present invention has a recorded program of a data recording apparatus for recording sampled audio data or video data onto a recording medium readable by an information processing apparatus. The program recorded on the second recording medium enables a computer to execute a data-analysis controlling step of controlling the analysis of input audio data; a sample-series-generation controlling step of controlling the generation of a series of samples by arranging samples of the audio data which are sampled with the same timing for a plurality of channels in a predetermined order on the basis of an analysis result in the analysis controlling step; an element-packet-generation controlling step of controlling the generation of an element packet by generating an audio frame by combining an even number of the series of the samples generated in the sample-series-generation controlling step and by adding header information indicating a channel configuration, the number of sample bits, and a sampling period to the audio frame; and a transmission-packet-generation controlling step of controlling the generation of a transmission packet by splitting the element packet generated in the element-packet-generation controlling step into transmission packets composed of a predetermined number of bits.

The input audio data is analyzed, and a series of samples is generated by arranging samples of audio data which are sampled with the same timing for a plurality of channels in a predetermined order on the basis of an analysis result. An even number of the generated series of the samples are combined to generate an audio frame, an element packet is generated by adding header information indicating a channel configuration, the number of sample bits, and a sampling period to the audio frame, and the element packet is divided into transmission packets composed of a predetermined number of bits to generate transmission packets.

A data playback apparatus according to the present invention reads and plays back sampled audio data or video data from a recording medium readable by an information processing apparatus. The data playback apparatus includes source-packet output means for outputting a source packet from the recording medium; element-packet generating means for generating an element packet from the source packet output from the source-packet output means; and decoding means for decoding the element packet generated by the element-packet generating means to output a series of samples of the audio data. The decoding means discards a sample added as a dummy channel of the series of the samples of the audio data if the number of channels of the audio data is an odd number.

The decoding means may discard predetermined 4 bits of the bits constituting the samples if the number of bits of the samples of the audio data is 20.

A data playback method according to the present invention relates to a data playback apparatus for reading and playing back sampled audio data or video data from a recording medium readable by an information processing apparatus. The data playback method includes a source-packet output step of outputting a source packet from the recording medium; an element-packet generating step of generating an element packet from the source packet output in the source-packet output step; a decoding step of decoding the element packet generated in the element-packet generating step to output a series of samples of the audio data; and a discarding step of discarding a sample added as a dummy channel of the samples of the audio data if the number of channels of the audio data is an odd number.

A second program according to the present invention relates to a data playback apparatus for reading and playing back sampled audio data or video data from a recording medium readable by an information processing apparatus. The second program enables a computer to execute a source-packet-output controlling step of controlling the output of a source packet from the recording medium; an element-packet-generation controlling step of controlling the generation of an element packet from the source packet output in the source-packet-output controlling step; a decoding controlling step of controlling the decoding of the element packet generated in the element-packet-generation controlling step to control the output of a series of samples of the audio data; and a discarding controlling step of controlling such that a sample added as a dummy channel of the samples of the audio data is discarded if the number of channels of the audio data is an odd number.

A third recording medium according to the present invention has a recorded program of a data playback apparatus for reading and playing back sampled audio data or video data from a recording medium readable by an information processing apparatus. The program recorded on the third recording medium enables a computer to execute a source-packet-output controlling step of controlling the output of a source packet from the recording medium; an element-packet-generation controlling step of controlling the generation of an element packet from the source packet output in the source-packet-output controlling step; a decoding controlling step of controlling the decoding of the element packet generated in the element-packet-generation controlling step to control the output of a series of samples of the audio data; and a discarding controlling step of controlling such that a sample added as a dummy channel of the samples of the audio data is discarded if the number of channels of the audio data is an odd number.

A source packet is output from the recording medium, an element packet is generated from the output source packet, and the generated element packet is decoded to output a series of samples of audio data.

A fourth recording medium according to the present invention has sampled audio data recorded in a data area thereof such that the audio data is readable by an information processing apparatus. Audio data recorded in the data area is generated by generating an audio frame on the basis of samples of the audio data which are sampled for a plurality of channels and by controlling such that the audio frame is generated by adding an audio sample for a dummy channel if the number of channels of the audio data is an odd number.

The number of bits of the samples is 16, 20, or 24, and if the number of bits of the samples is 20, a predetermined pattern of 4 bits may be added to the samples.

A second data recording apparatus according to the present invention records sampled audio data or video data onto a recording medium readable by an information processing apparatus. The second data recording apparatus includes audio-frame generating means for generating an audio frame by adding an audio sample for a dummy channel if the number of channels of the audio data is an odd number.

A second data recording method according to the present invention relates to a data recording apparatus for recording sampled audio data or video data onto a recording medium readable by an information processing apparatus. The second data recording method includes an audio-frame generating step of generating an audio frame by adding an audio sample for a dummy channel if the number of channels of the audio data is an odd number.

A third program according to the present invention relates to a data recording apparatus for recording sampled audio data or video data onto a recording medium readable by an information processing apparatus. The third program enables a computer to execute an audio-frame-generation controlling step of controlling such that an audio frame is generated by adding an audio sample for a dummy channel if the number of channels of the audio data is an odd number.

A fifth recording medium according to the present invention has a recorded program of a data recording apparatus for recording sampled audio data or video data onto a recording medium readable by an information processing apparatus. The fifth program recorded on the recording medium enables a computer to execute an audio-frame-generation controlling step of controlling such that an audio frame is generated by adding an audio sample for a dummy channel if the number of channels of the audio data is an odd number.

If the number of channels of input audio data is an odd number, an audio sample for a dummy channel is added to generate an audio frame.

BRIEF DESCRIPTION OF THE DRAWINGS

FIG. 5 is a diagram showing the syntax of LPCM_audio_data_payload of the PES packet in FIG. 4.

FIG. 10 is a diagram showing the relationship between the number of GOLS and the data size of LPCM_audio_frame.

FIG. 11 is a diagram showing audio_data_payload_size at each sampling frequency.

FIG. 12 is a diagram showing the syntax of LPCM_audio_data_header of the PES packet in FIG. 4.

FIG. 13 is a diagram showing a channel assignment.

FIG. 15 is a diagram of examples of values indicating sampling frequencies.

FIG. 16 is a diagram of examples of values indicating the number of sample bits.

BEST MODE FOR CARRYING OUT THE INVENTION

Figure 1:
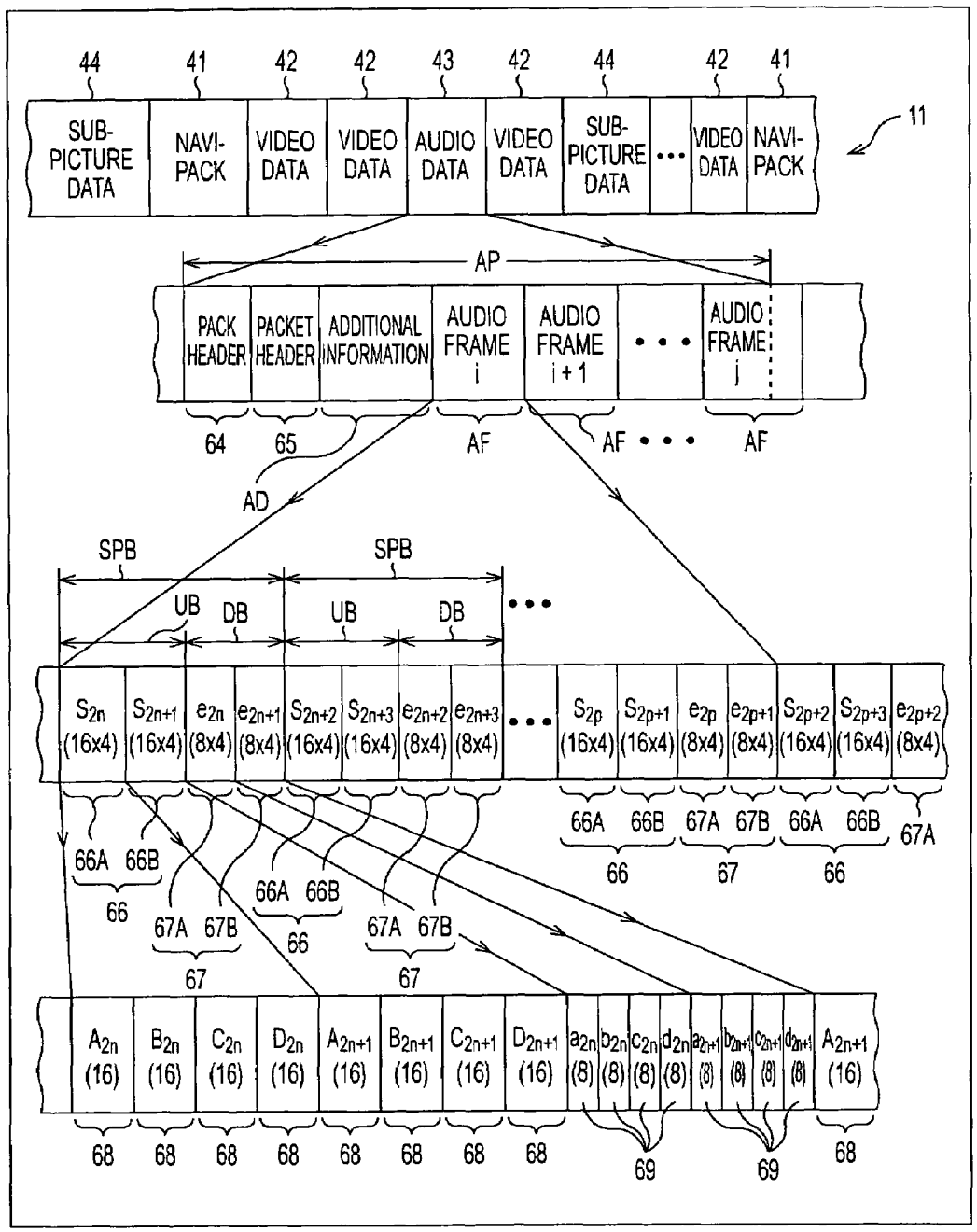
FIG. 1 is a diagram showing a known method for recording audio data.
Figure 2:
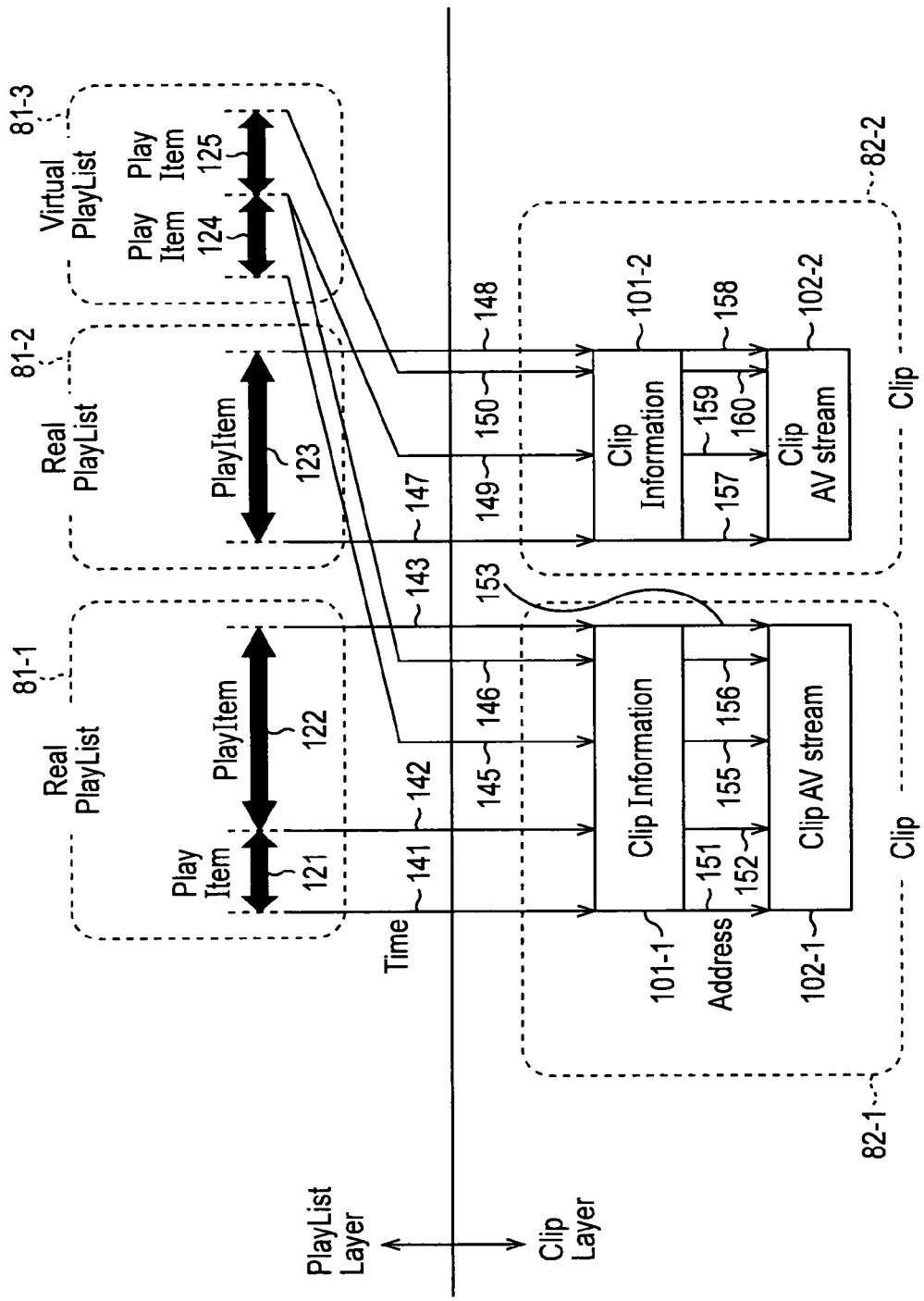
FIG. 2 is a diagram showing a logical structure of data recorded according to the present invention.

FIG. 2 is a diagram showing a logical structure of data recorded according to the present invention. In this example, recorded data is classified into a playlist layer (PLAYLIST LAYER) and a clip layer (CLIP LAYER). In this example, the clip layer includes a CLIP 82-1 and a CLIP 82-2, and the playlist layer includes PLAYLISTs 81-1 to 81-3 for managing the CLIPs 82-1 and 82-2.

The CLIPs 82-1 and 82-2 are an object including an AV stream file and its associated information (Clip Information). The CLIP 82-1 includes an AV stream file 102-1 and Clip Information 101-1 which is associated information thereof, and the CLIP 82-2 includes an AV stream file 102-2 and Clip Information 101-2 which is associated information thereof.

The PLAYLISTs 81-1 to 81-3 are files describing a plurality of segments for decoding in a CLIP. In the PLAYLIST 81-1, PlayItems 121 and 122 are described as segments for decoding. Similarly, in the PLAYLIST 81-2, a PlayItem 123 is described as a segment for decoding. In the PLAYLIST 81-3, PlayItems 124 and 125 are described as segments for decoding.

The content of the AV stream file 102-1 in the CLIP 82-1 is developed on the time axis, and the Clip Information 101-1 converts the time (time stamp) specified with the PLAYLIST 81-1 (PlayItems 121 and 122) or the PLAYLIST 81-3 (PlayItem 124) to an address indicating the data to be decoded in the AV stream file 102-1.

The CLIP 82-2 has the same structure as the CLIP 82-1, and the Clip Information 101-2 converts the time stamp specified with the PLAYLIST 81-2 (PlayItem 123) or the PLYALIST 81-3 (PlayItem 125) to an address indicating the data to be decoded in the AV stream file 102-2.

In the PlayItems 121 to 125, a start point and an end point on the time axis are specified for the content of the AV stream file 102-1 or the AV stream file 102-2.

For example, the start point and end point of the PlayItem 121 are specified with the time stamps respectively corresponding to arrows 141 and 142, and the Clip Information 101-1 converts the specified time stamps to the addresses indicating the data to be decoded in the AV stream file 102-1, so that the segment from the point specified with the address corresponding to an arrow 151 in the AV stream file 102-1 to the point specified with the address corresponding to an arrow 152 are set as a segment for decoding.

In the PlayItem 122, similarly, a start point and an end point are specified with the time stamps respectively corresponding to the arrow 142 and an arrow 143, and converted by the Clip Information 101-1 to the addresses indicating the data to be decoded in the AV stream file 102-1. The segment from the point specified with the address corresponding to the arrow 152 in the AV stream file 102 to the point specified with the address corresponding to an arrow 153 is set as the segment for decoding.

Similarly, the start point and end point of the PlayItem 123 are specified with the time stamps respectively corresponding to arrows 147 and 148, and the Clip Information 101-2 converts the specified time stamps to the addresses indicating the data to be decoded in the AV stream file 102-2, so that the segment from the point specified with the address corresponding to an arrow 157 in the AV stream file 102-2 to the point specified with the address corresponding to an arrow 158 are set as the segment for decoding.

The start point and end point of the PlayItem 124 are also specified with the time stamps respectively corresponding to arrows 145 and 146, so that the segment from the point specified with the address corresponding to an arrow 155 in the AV stream file 102-1 to the point specified with the address corresponding to an arrow 156 are set as the segment for decoding. The start point and end point of the PlayItem 125 are specified with the time stamps respectively corresponding to arrows 149 and 150, so that the segment from the point specified with the address corresponding to an arrow 159 in the AV stream file 102-2 to the point specified with the address corresponding to an arrow 160 are set as the segment for decoding.

There are two types of PLAYLISTs. One type is called a RealPLAYLIST, which corresponds to the PLAYLISTs 81-1 and 81-2 in this example. When one AV stream file is recorded as one CLIP, a RealPLAYLIST specifying the entire decodable range in the CLIP is automatically generated. In this example, the PLAYLIST 81-1, which is a RealPLAYLIST, is generated corresponding to the CLIP 82-1, and the PLAYLIST 81-2, which is a RealPLAYLIST, is generated corresponding to the CLIP 82-2.

A RealPLAYLIST is recorded onto a medium as part of a CLIP, and when a part of the RealPLAYLIST is eliminated, the AV stream file corresponding to the eliminated part is also eliminated. For example, when the PlayItem 121 in the PLAYLIST 81-1 is eliminated, the segment from the point specified with the address corresponding to the arrow 151 in the AV stream file 102 to the point specified with the address corresponding to the arrow 152 is also eliminated.

The other of the two types of PLAYLISTs is called a VirtualPLAYLIST, which corresponds to the PLAYLIST 81-3. A VirtualPLAYLIST is generated independently of a CLIP, and even if part of the VirtualPLAYLIST is eliminated, the CLIP does not change. For example, even if the PlayItem 124 in the PLAYLIST 81-3 is eliminated, the segment from the point specified with the address corresponding to the arrow 155 in the AV stream file 102-1 to the point specified with the address corresponding to the arrow 156 is not eliminated.

Figure 3:
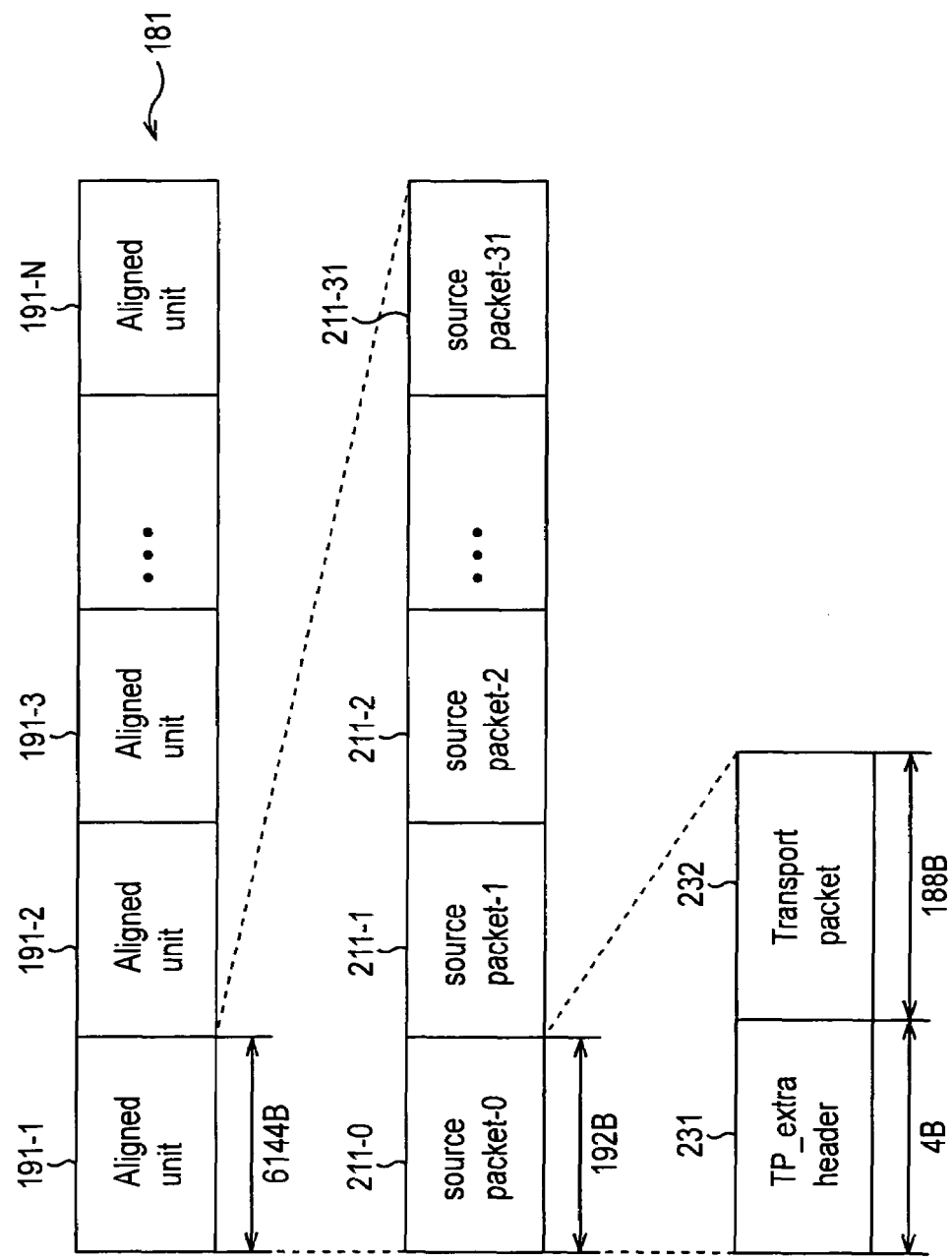
FIG. 3 is a diagram showing the structure of recorded data on a recording medium.

FIG. 3 is a diagram showing the structure of data recorded on a recording medium according to the present invention. Data recorded onto a recording medium has a transport stream format, and a transport stream 181 includes N units, i.e., Alignedunits 191-1 to 191-N.

One Alignedunit 191-i (i=1, 2, ..., N) includes each of 32 source packets, i.e., sourcepackets 221-0 to 221-31. The data length of one source packet, i.e., a sourcepacket 221-i (i=0, 1, 2, ..., 31) is 192 bytes, and therefore the data length of an Alignedunit 191-i is 6144 (192×32) bytes.

Furthermore, one source packet, i.e., a sourcepacket 221-i includes each of a TP_extraheader 231, which is a 4-byte transport header, and a Transportpacket 232, which is a 188-byte transport packet. The PES packet in FIG. 4 is divided for storage in transport packets.

Figure 4:
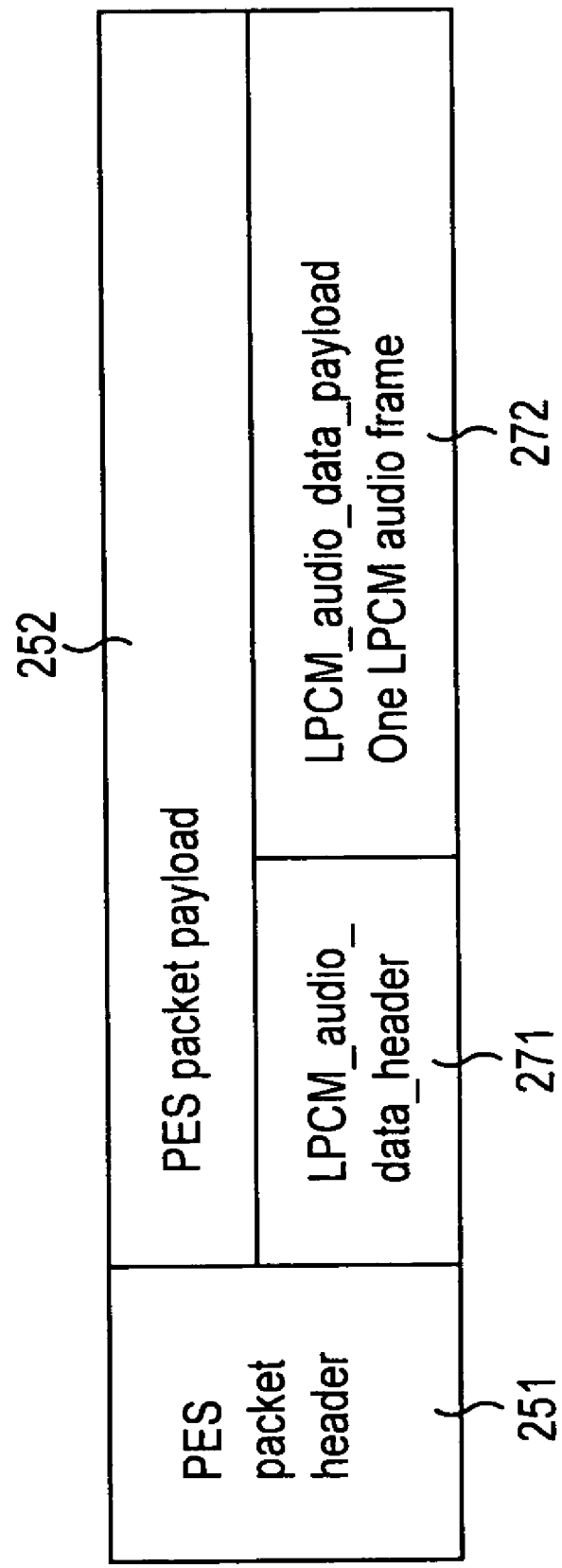
FIG. 4 is a diagram showing the structure of a PES packet.

FIG. 4 is a diagram showing an example structure of a PES packet of LPCM audio data. This PES packet includes a PESpacketheader 251 and a PESpacketpayload 252. The PESpacketheader 251 includes information for identifying the PES packet, such as a Stream_id and a PTS_DTS_flag.

The PESpacketpayload 252 includes an LPCM_audio_data_header 271 and an LPCM_audio_data_payload 272.

First, the structure of the LPCM_audio_data_payload 272 will be described. FIG. 5 shows the syntax of the LPCM_audio_data_payload 272. As shown in this figure, one LPCM_audio_frame is stored in the LPCM_audio_data_payload 272.

The structure of the LPCM_audio_frame will now be described. LPCM audio data includes samples which have been sampled with a sampling period of 48 kHz or 96 kHz. The number of bits of one sample is either of 16 bits, 20 bits, and 24 bits.

Figure 6:
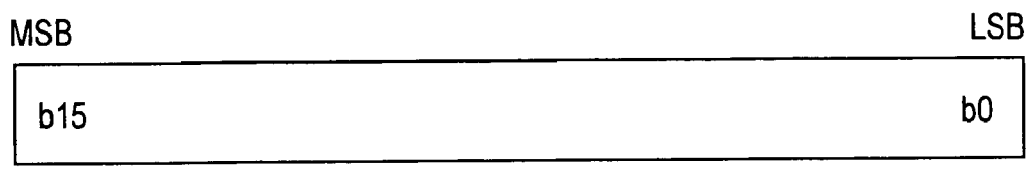
FIG. 6 is a diagram showing an example structure of a sample with the number of bits of 16.
Figure 7:
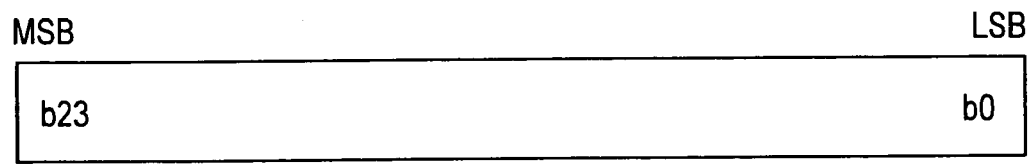
FIG. 7 is a diagram showing an example structure of a sample with the number of bits of 24.
Figure 8:
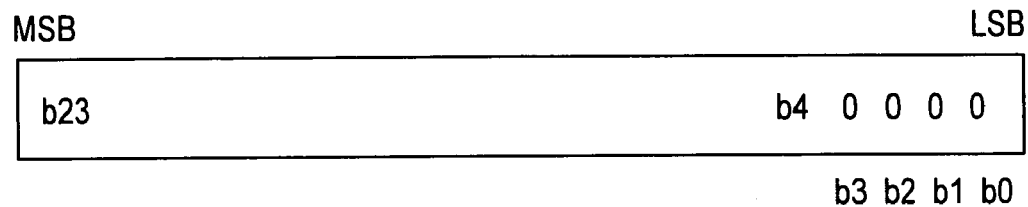
FIG. 8 is a diagram showing an example structure of a sample with the number of bits of 20.

FIGS. 6 to 8 are diagrams showing samples of LPCM audio data according to the present invention. FIG. 6 is a diagram showing an example structure with the number of sample bits of 16. The 16 bits from the MSB (b15) to the LSB (b0) define one sample. FIG. 7 is a diagram showing an example structure with the number of sample bits of 24. The 24 bits from the MSB (b23) to the LSB (b0) define one sample. FIG. 8 is a diagram showing an example structure with the number of sample bits of 20. There are 20 bits from the MSB (b23) to the b4, followed by four bits from the b3 to the LSB (b0) which are set as "0". In this manner, even though the number of bits of the sample is 20, one sample can be composed of 24 bits, as in FIG. 7, by adding four bits of 0.

These samples are generated for each channel to define a series of samples called a GOLS (Group of LPCM samples) by combining the samples of each channel.

Figure 9:
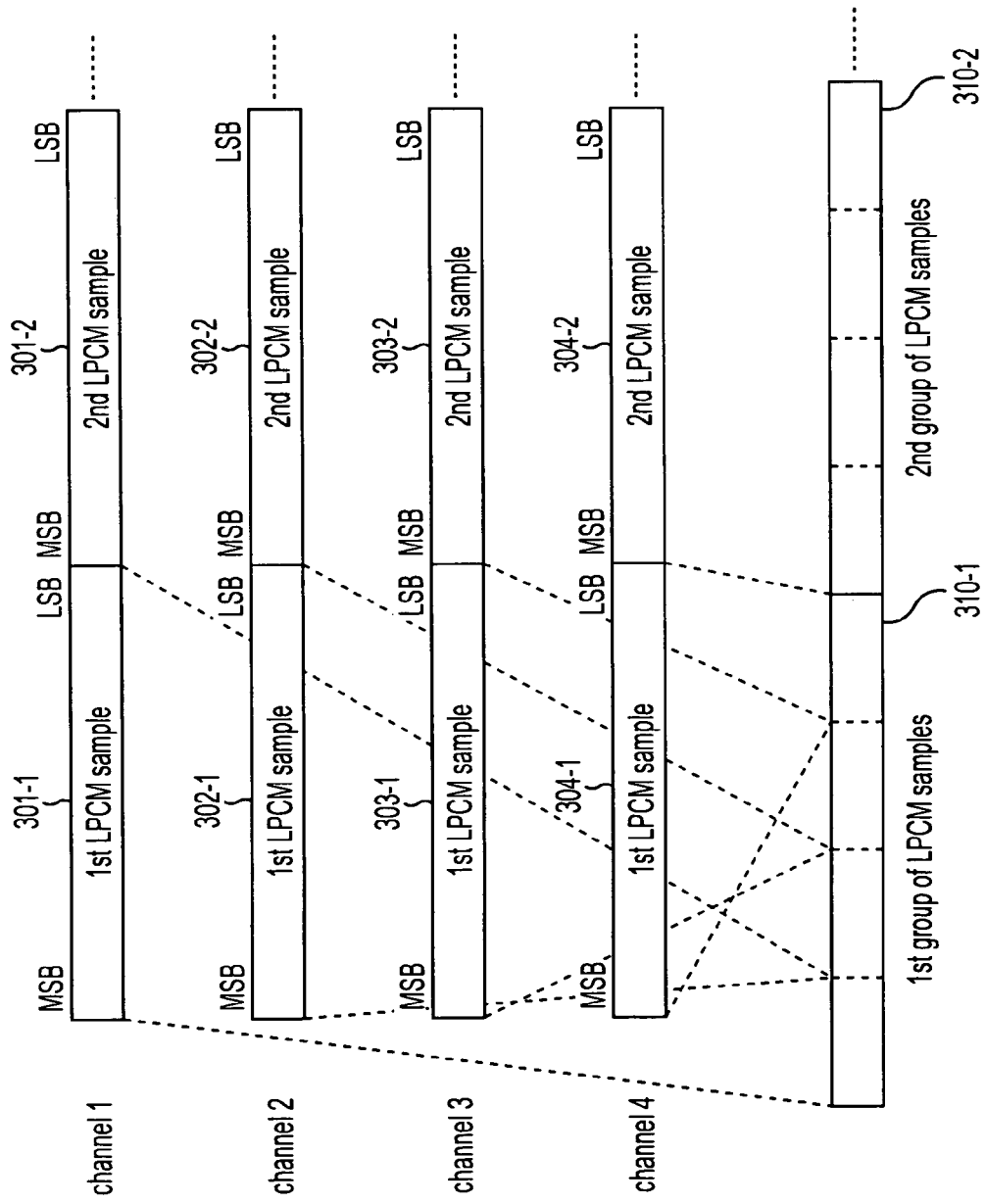
FIG. 9 is a diagram showing an example structure of GOLS.

FIG. 9 is a diagram showing an example structure of GOLS. In this example, a GOLS is generated from four channels of LPCM audio data from Channel 1 to Channel 4. A first sample 301-1 of Channel 1, a first sample 302-1 of Channel 2, a first sample 303-1 of Channel 3, and a first sample 304-1 of Channel 4 are combined in the order from Channel 1 to Channel 4 to define a first GOLS 310-1. Similarly, a second GOLS 310-2 is defined by second samples 301-2 to 304-2 of Channel 1 to Channel 4.

This example has been described assuming that the number of channels is 4. In practice, the number of channels may be 2, 4, 6, or 8. According to the present invention, the number of channels is always an even number.

An LPCM_audio_frame is defined by collecting a predetermined number of GOLS constructed in this manner. As described above, one LPCM_audio_data_payload 272 (FIG. 4) includes one LPCM_audio_frame.

FIG. 10 is a diagram showing the relationship between the number of GOLS, the number of channels, and the data size of the LPCM_audio_frame. In the first line to the fourth line, the data sizes of LPCM_audio_frames with the number of channels of 2, 4, 6, and 8 are each represented in bytes (fourth column from the left) and in bits (fifth column from the left) in a case where the number of GOLS is 2 and the number of sample bits is 16 (FIG. 6). Furthermore, in the fifth line to the eighth line, the data sizes of LPCM_audio_frames with the number of channels of 2, 4, 6, and 8 are each represented in bytes and in bits in a case where the number of GOLS is 2 and the number of sample bits is 24 (FIG. 7 or 8). In the ninth line to the 16th line, values in a case where the number of GOLS is 4 are shown.

The rightmost column in the figure indicates values obtained by dividing the data size (fifth column from the left) of the LPCM_audio_frame by 32. All the values are integers. In other words, all data sizes of the LPCM_audio frames shown in the fifth column from the left are divisible by 32 bits. This example has been described assuming that the number of GOLS is 2 or 4. As long as the number of GOLS is an even number, the data size (represented in bits) of an LPCM_audio_frame is divisible by 32 bits. In general, a DVD recording and playback apparatus carries out signal processing in units of 32 bits, and therefore if the data size of an LPCM_audio_frame of data recorded on a DVD is an integral multiple of 32 bits, a higher affinity is achieved. For this reason, according to the present invention, the number of GOLS defining one LPCM_audio_frame is always an even number.

FIG. 11 is a diagram showing an example of the data size of an actual LPCM_audio_frame. In this example, the number of GOLS is 240 for a sampling frequency of 48 kHz, and the number of GOLS is 480 for a sampling frequency of 48 kHz, in each case of which an LPCM_audio_frame with a playback time of 5 milliseconds is constructed. In the same manner as in FIG. 10, the number of bits per sample is shown in the second column from the left, and the number of channels is shown in the third column from the left. In the rightmost column, the data sizes of LPCM_audio_frames are indicated in bytes.

The structure of the LPCM_audio_data_header 271 (FIG. 4) will now be described. FIG. 12 shows the syntax of the LPCM audio_data_header 271. In the figure, the fields included in the LPCM_audio_data_header 271, i.e., "audio_data_payload_size", "channel_assigment", "sampling_frequency", "bits_per_sample", and "start_flag" are shown along with the number of bits (No. of bits) defining those fields and Mnemonics. The last five bits of the LPCM_audio_data_header 271 is "reserved_for_word_align", which is reserved for future use.

The field "audio_data_payload_size" is composed of 16 bits, and a value indicating the size of the LPCM_audio_data_payload 272 is stored. As described above, one LPCM_audio_frame is stored in the LPCM_audio_data_payload 272, and its value corresponds to the value (data size of the LPCM_audio_frame) shown in the rightmost column of FIG. 11. For example, if the sampling frequency is 48 KHz, the number of bits per sample is 24, and the number of channels is 6, a value of 4320 is stored in the field "audio_data_payload_size".

The field "channel_assigment" is composed of 4 bits, storing a value indicating the type of the channel assignment. FIG. 13 shows the types of channel assignments.

In FIG. 13, the number of channels is indicated in the second column from the left, channel configurations are indicated in the third column from the left, and the content of each channel is indicated in the rightmost column.

As shown in the figure, two or more channel configurations are available regardless of the same number of channels. For example, when the number of channels is 2, three types of "mono", "dualmono", and "stereo" are available. "mono" indicates that an audio signal is output from one speaker, "dualmono" indicates that the same audio signal is output from two speakers, and "stereo" indicates that different (left and right) audio signals are output from two speakers independently from each other.

In this case, two channels of channel 1 and channel 2 are assigned as follows. In the case of "stereo", data (L) corresponding to an audio signal output from the left speaker is assigned to channel 1, and data (R) corresponding to an audio signal output from the right speaker is assigned to channel 2. In the case of "dualmono", the same data (M) is assigned to channel 1 and channel 2. In the case of "mono", since an audio signal is output from one speaker, channel 1 has data (M) assigned, but channel 2 does not have data to be assigned. Here, as described above, an even number is used as the number of channels according to the present invention. In this case, data (X) whose values are all 0 is assigned to channel 2. As described above, despite the number of channels being originally an odd number, an even number of channels can be assigned by adding data (X) whose values are all 0.

Figure 14A:
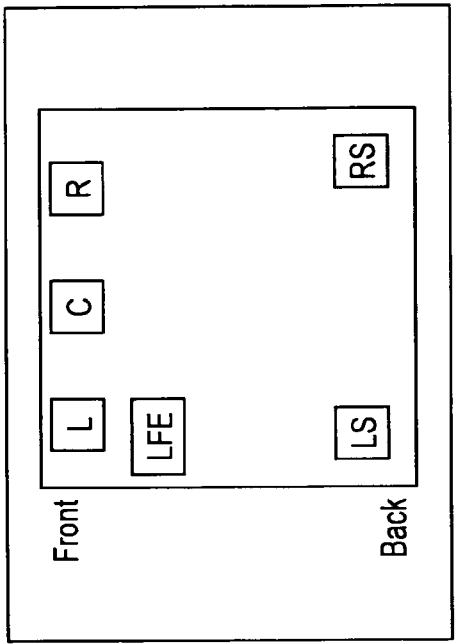
FIG. 14A is a diagram showing an example layout of speakers in each channel configuration.

Furthermore, other types of channel configurations are also available. FIG. 14 shows examples of channel configurations. FIG. 14A shows a channel configuration of "LCRS(3/1)", corresponding to the third line (Value: 6) from the top of the section where the number of channels is 4 in FIG. 13. "LCRS (3/1)" indicates that four different audio signals are respectively output from a front-left speaker L, a front-center speaker C, a front-right speaker R, and a rear-center speaker S.

Figure 14B:
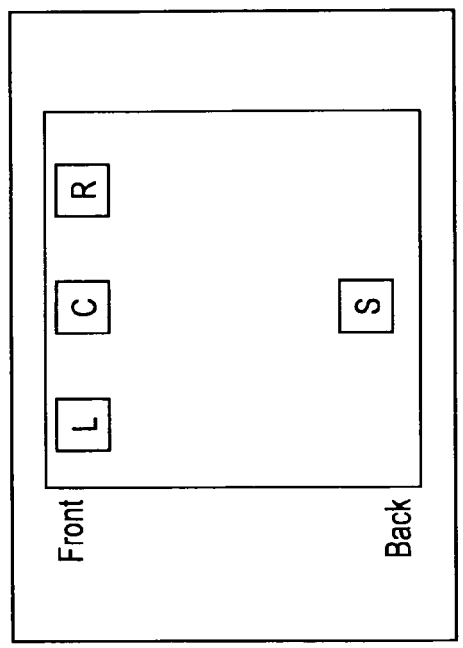
FIG. 14B is a diagram showing an example layout of speakers in each channel configuration.

FIG. 14B shows a channel configuration of "L,C,R,LS,RS, lfe(3/2+lfe)", corresponding to the second line from the top of the section where the number of channels is 6 in FIG. 13. "L,C,R,LS,RS,lfe(3/2+lfe)" indicates that six different audio signals are respectively output from a front-left speaker L, a front-center speaker C, a front-right speaker R, a rear-left speaker LS, a rear-right speaker RS, and a low-frequency-dedicated speaker lfe.

Figure 14C:
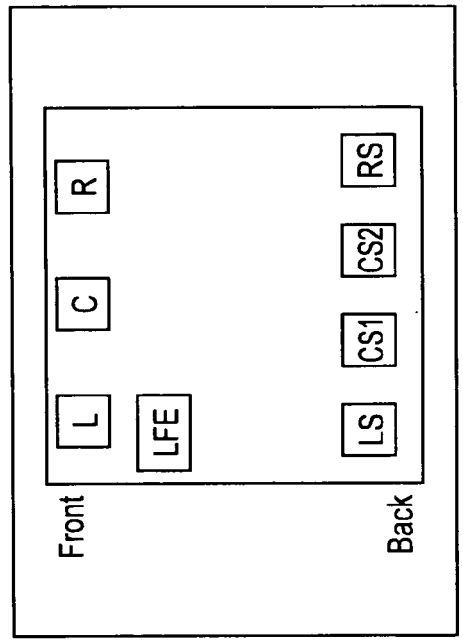
FIG. 14C is a diagram showing an example layout of speakers in each channel configuration.

FIG. 14C shows a channel configuration of "L,C,R,LS,CS1,CS2,RS,lfe(3/4+lfe)", corresponding to the second line from the top of the section where the number of channels is 8 in FIG. 13. "L,C,R,LS,CS1,CS2,RS,lfe(3/4+lfe)" indicates that eight different audio signals are respectively output from a front-left speaker L, a front-center speaker C, a front-right speaker R, a rear-left speaker LS, a first rear-center speaker CS1, a second rear-center speaker CS2, a rear-right speaker RS, and a low-frequency-dedicated speaker lfe.

As described above, audio data corresponding to the audio signal output from each speaker is assigned to the respective channel in accordance with the channel configuration. As described above, in the case of channel configurations originally with an odd number of channels, more specifically, if the channel configuration is "mono" (originally one channel), "L,C,R,(3/0)" (originally three channels), "L,R,S(2/1)" (originally three channels), "L,C,R,LS,RS,(3/2)" (originally five channels), or "L,C,R,LS,CS1,CS2,RS(3/4)" (originally seven channels), the last channel is assigned data (X) whose values are all 0, so that the channel configuration is converted to an even number of channels. In short, the above-described channel configurations are converted to two channels, four channels, four channels, six channels, and eight channels, respectively.

In the field "channel_assigment", for example, if the channel configuration is "L,C,R,(3/0)", a value of 4 (Value in FIG. 13) is stored.

The field "sampling_frequency" is composed of 4 bits, and a value indicating a sampling frequency is stored. FIG. 15 is a diagram showing values stored in this case. For example, if the sampling frequency is 48 KHz, 1 is stored as the value for the field "sampling_frequency".

The field "bits_per_sample" is composed of 2 bits, and a value representing the number of sample bits is stored. FIG. 16 is a diagram showing values stored in this case. For example, if the number of sample bits is 24, 3 is stored as the value for the field "bits_per_sample".

The field "start_flag" is composed of 1 bit, and a value indicating whether the relevant PES packet is a start point of an audio track or not is stored. For example, when several pieces of music data are recorded as audio data to be recorded, 1 is set to the field "start_flag" in the PES packet including the first data of each piece of music. In this manner, when the recorded data is to be played back, the start point of the track can be detected.

As described above, the LPCM_audio_data_header 271 includes the fields "audio_data_payload_size", "channel_ assigment", "sampling_frequency", "bits_per_sample", and "start_flag", and a PES packet is constructed on the basis of the LPCM_audio_data_header 271 and the LPCM_audio_ data_payload 272. As described above with reference to FIG. 3, a PES packet is divided into the 188-byte Transportpacket 232, the TP_extraheader 231 is added, and recording is carried out as the sourcepackets 221-0 to 221-31.

Figure 17:
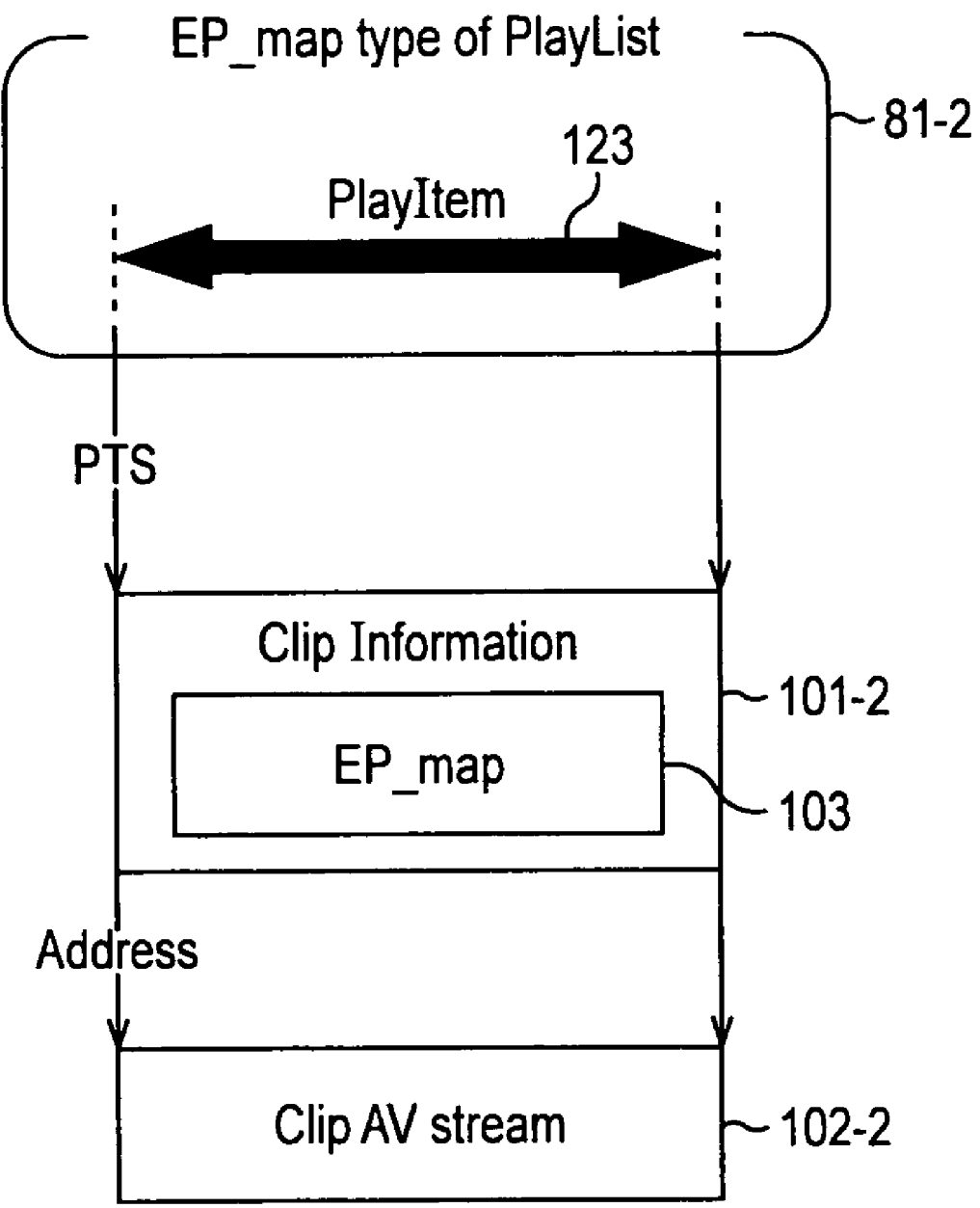
FIG. 17 is a diagram describing EP_map.

A description has been given above about the PLAYLIST for specifying a time stamp in a CLIP as an access point and the Clip Information for converting the specified time stamp to an address indicating data to be decoded in an AV stream file in data recorded in this manner. Details in this processing will be described with reference to FIG. 17.

The Clip Information 101-2 converts a time stamp (PTS) to an address with reference to an EP_map 103 which is an address conversion table. In the EP_map 103, addresses corresponding to time stamps are stored, and these addresses are set as the numbers of the sourcepackets 221-0 to 221-31 (FIG. 3). Transport packets included in one CLIP are assigned source packet numbers (SPN) as a series of numbers. For example, the sourcepacket 221-0 is assigned as SPN0, and the sourcepacket 221-1 is assigned as SPN1. Then, in the EP_map 103, the time stamp corresponding to the SPN is stored.

Figure 18:
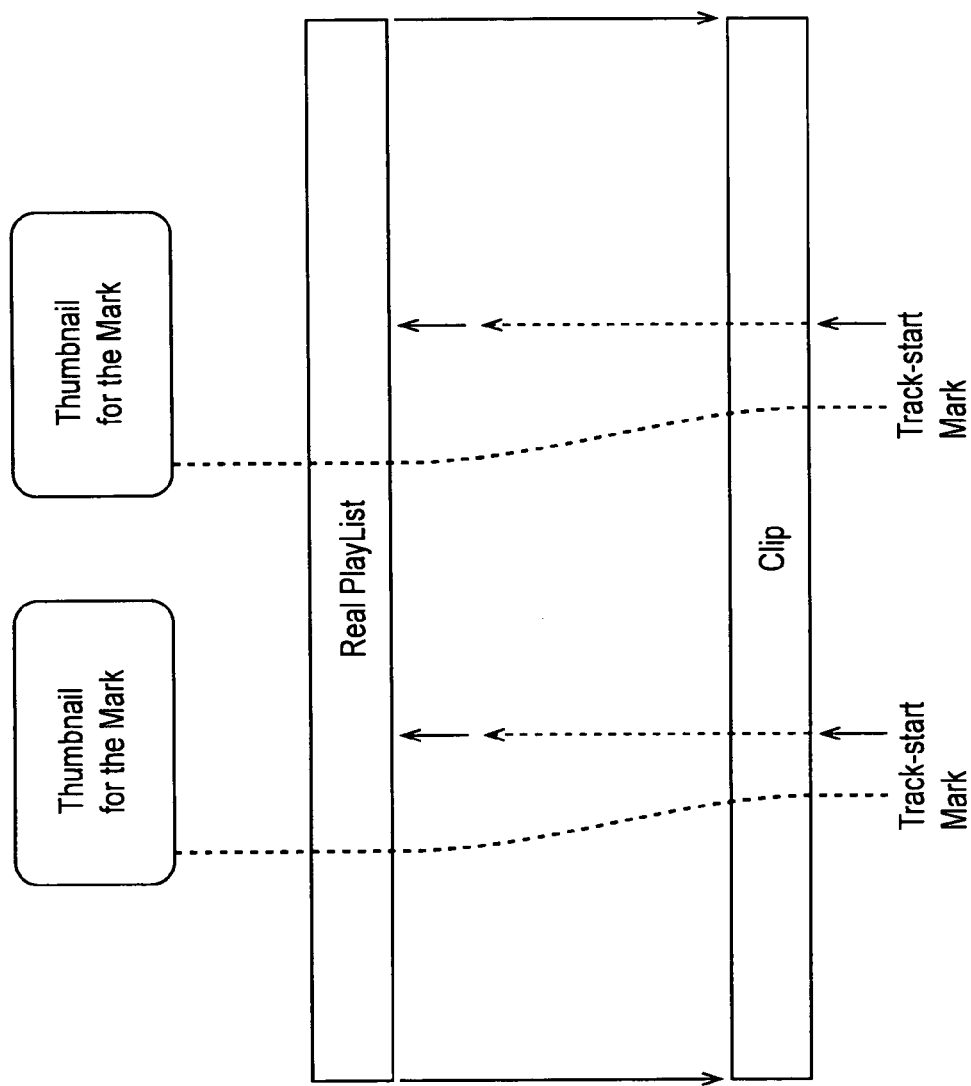
FIG. 18 is a diagram describing Track-start-Mark.

Furthermore, for a source packet including a PES packet having 1 set to the above-described field "start_flag", the SPN is marked as Track-Startmarks, i.e., a track start point, as shown in FIG. 18. In this manner, it becomes easy to specify data with the PLAYLIST.

Figure 19:
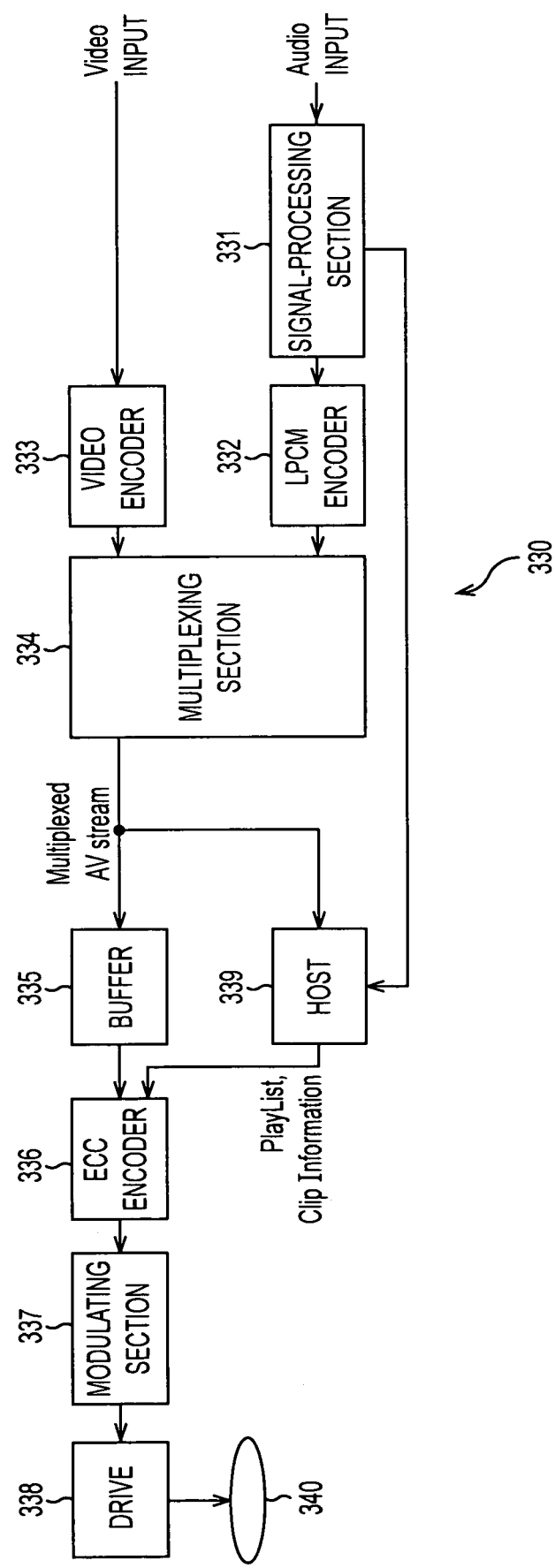
FIG. 19 is a block diagram showing an example structure of a data recording apparatus according to the present invention.

FIG. 19 is a block diagram showing an example structure of a data recording apparatus 330 according to the present invention. Input audio data is analyzed by a signal-processing section 331 and output to an LPCM encoder 332. The LPCM encoder 332 generates an audio PES packet from the input audio data, whereas a video encoder 333 generates a video PES packet from the input video data, so that each of the packets is output to a multiplexing section 334.

The multiplexing section 334 generates a transport stream from the audio PES packet and the video PES packet, and outputs it to a buffer 335 and a host 339. The host 339 analyzes the transport stream, generates data of the EP_map and the Track-Startmark, and outputs the data to an ECC encoder 336. The ECC encoder 336 adds data output from the host to the transport stream output from the buffer 335, and furthermore, adds an error correction code to output the result to a modulating section 337. The modulating section 337 digitally modulates data output from the ECC encoder 336 and outputs it to a drive 338, which records the data onto a medium 340.

The operation of the data recording apparatus 330 will now be described with reference to FIGS. 20 to 25. In step S1, the signal-processing section 331 accepts input of audio data. At this time, as audio data, for example, an IEC 60958-compliant LPCM audio data stream is input.

Figure 21:
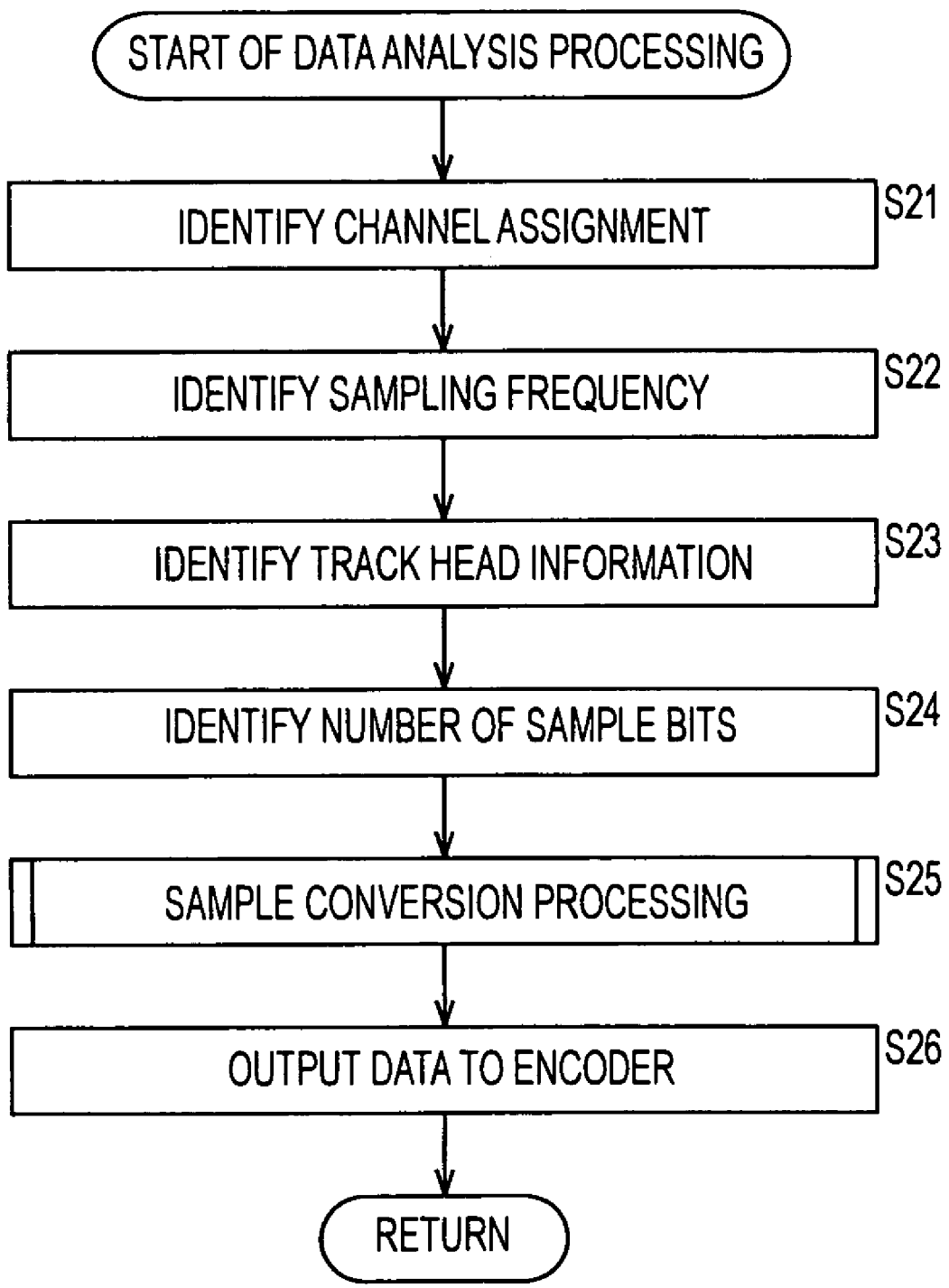
FIG. 21 is a flowchart describing data analysis processing.

In step S2, the signal-processing section 331 carries out data analysis processing to be described below with reference to FIG. 21. As a result, information such as a channel assignment and a sampling frequency is identified. In step S3, the LPCM encoder 332 carries out encoding to be described below with reference to FIG. 23. As a result, an audio PES packet is generated.

In step S4, the multiplexing section 334 multiplexes the audio PES packet and the video PES packet to generate a transport stream. The transport stream is output to the buffer 335 and the host 339.

In step S5, the host 339 analyzes the transport stream, generates data of the EP_map and the Track-Startmark, and outputs the data to the ECC encoder 336.

In step S6, the ECC encoder 336 and the ECC encoder 336 add data output from the host 339 to the transport stream output from the buffer 335, and furthermore, adds an error correction code to output the result to the modulating section 337.

In step S7, the modulating section 337 digitally modulates data output from the ECC encoder 336 and outputs the data to the drive 338. In step S9, the drive 338 records the data onto the medium 340.

In this manner, data recording is carried out.

The data analysis processing in step S2 of FIG. 20 will now be described with reference to FIG. 21.

In step S21, the signal-processing section 331 analyzes input audio data and identifies the channel assignment. As a result, the number of channels of the relevant audio data and the channel configuration are identified. In step S22, the signal-processing section 331 identifies the sampling frequency of the relevant audio data.

In step S23, the signal-processing section 331 identifies the track head information. At this time, for example, in an IEC 60958-compliant audio stream, information about a Qbit sequence (Q channel) of UserData is acquired to identify the track head position from the track number and the index number.

In step S24, the signal-processing section 331 identifies the number of sample bits of the relevant audio data.

Figure 22:
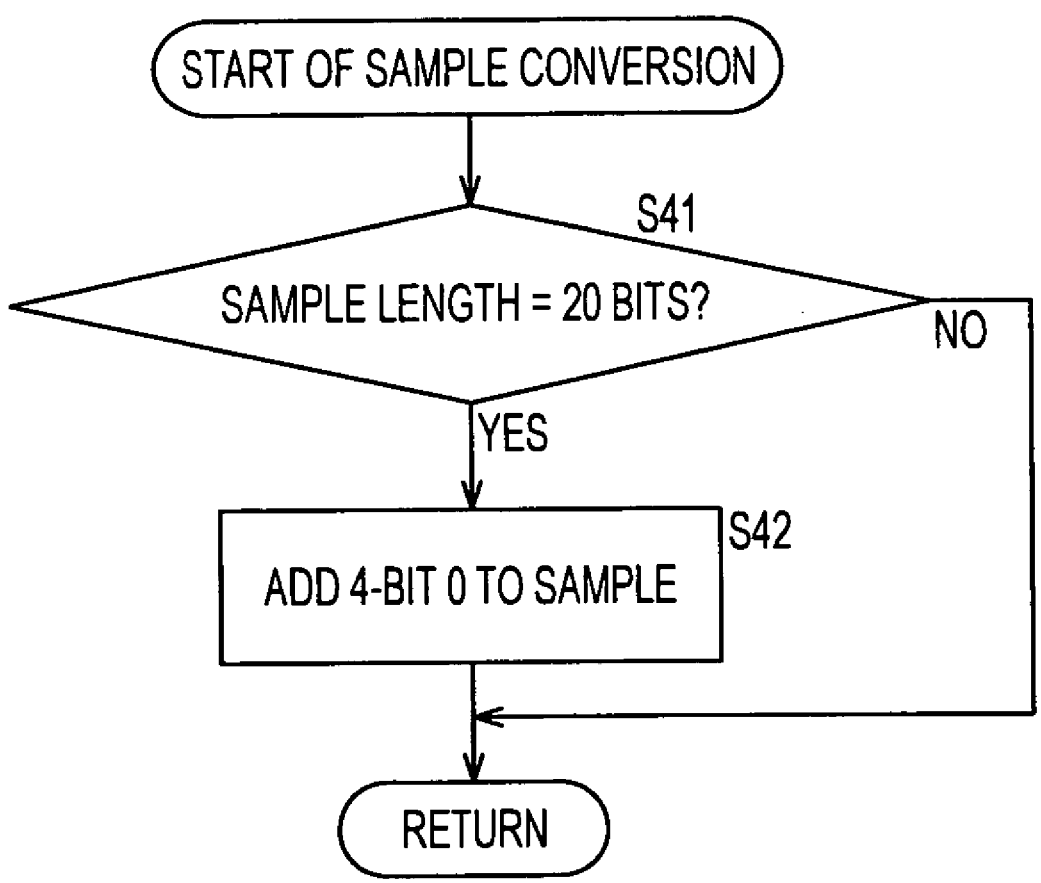
FIG. 22 is a flowchart describing sample conversion.

In step S25, the signal-processing section 331 carries out sample conversion to be described below with reference to FIG. 22. As a result, a 20-bit sample is converted to a 24-bit sample.

In step S26, the signal-processing section 331 outputs data to the LPCM encoder 332.

In this manner, the input audio data is analyzed, and the result of the analysis is output to the LPCM encoder 332.

Sample conversion in step S25 of FIG. 21 will now be described with reference to FIG. 22.

In step S41, the signal-processing section 331 determines whether or not the number of sample bits is equal to 20, and if a determination is made that the number of sample bits is equal to 20, the flow proceeds to step S42, where a 4-bit 0 is added to the sample. At this time, as shown in FIG. 8, four 0 bits are added to the LSB end of the 20-bit sample to convert the 20-bit sample to a 24-bit sample.

On the other hand, if a determination is made in step S41 that the number of sample bits is not equal to 20, i.e., if the number of sample bits is 16 bits or 24 bits, the processing in step S42 is skipped.

In this manner, the 20-bit sample is converted to a 24-bit sample.

Figure 23:
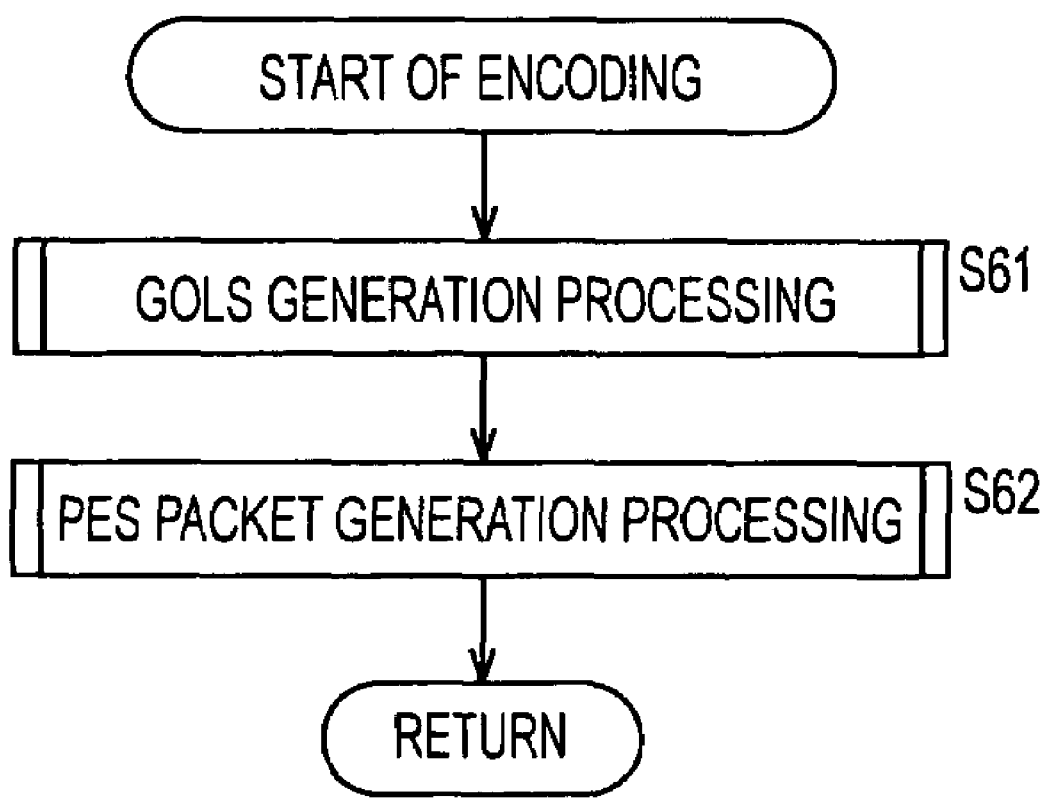
FIG. 23 is a flowchart describing encoding.

Encoding in step S3 of FIG. 20 will now be described with reference to FIG. 23. In step S61, the LPCM encoder 332 carries out GOLS generation processing to be described below with reference to FIG. 24. As a result, a GOLS is generated. In step S62, the LPCM encoder 332 carries out PES packet generation processing to be described below with reference to FIG. 25. As a result, a PES packet is generated.

Figure 24:
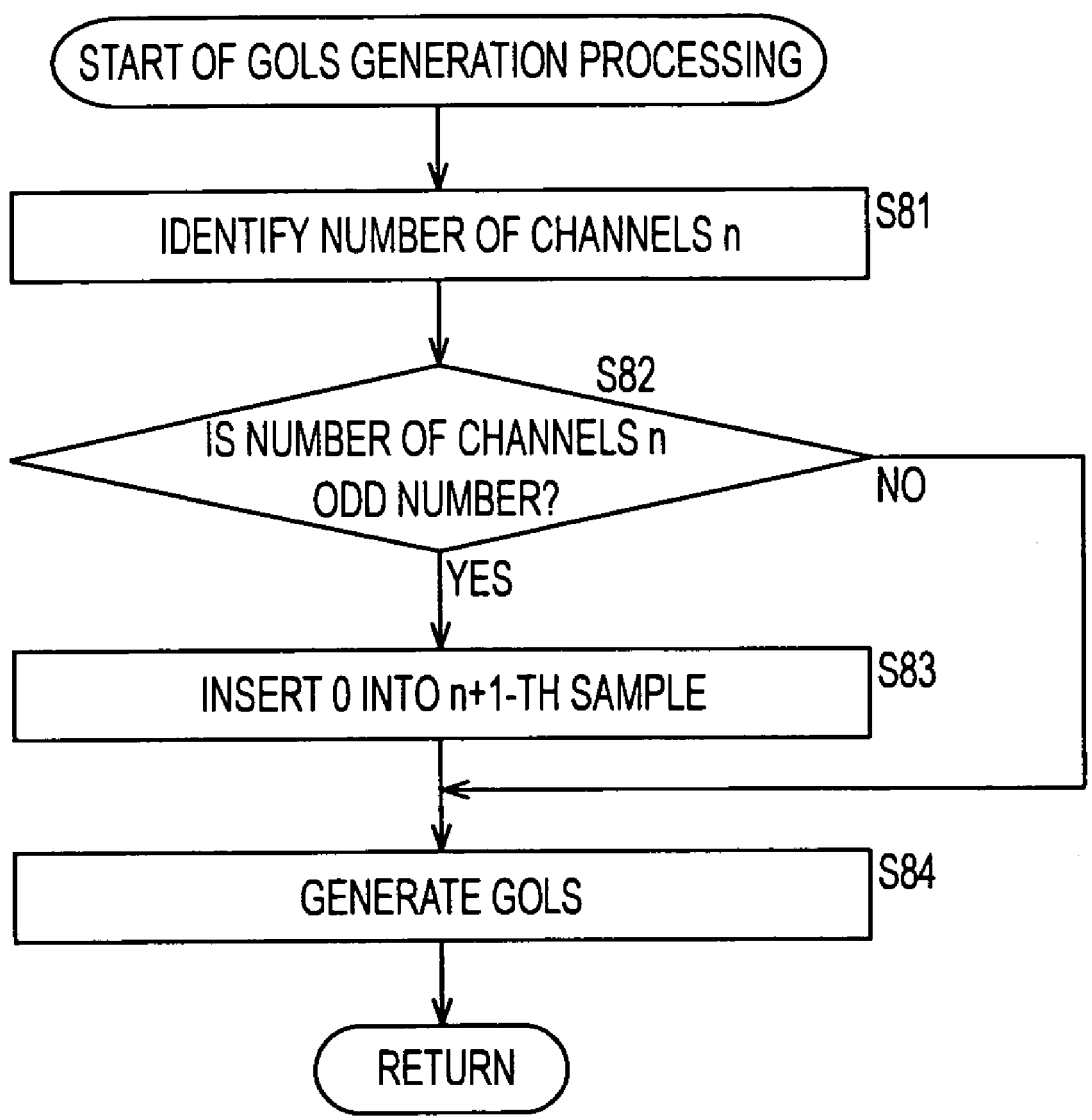
FIG. 24 is a flowchart describing GOLS generation processing.

The GOLS generation processing in step S61 of FIG. 23 will now be described with reference to FIG. 24. In step S81, the LPCM encoder 332 identifies the number of channels n of the relevant audio data. In step S82, the LPCM encoder 332 determines whether or not the number of channels n is an odd number. In the case of a channel configuration originally with an odd number of channels, data (X) whose values are all 0 is assigned as the last channel according to the present invention, as described above with reference to FIG. 13. If a determination is made in step S82 that the number of channels n is an odd number, the flow proceeds to step S83, where the LPCM encoder inserts 0 to the n+1-th sample.

If a determination is made in step S82 that the number of channels n is not an odd number (i.e., an even number), the processing in step S83 is skipped.

In step S84, the LPCM encoder generates a GOLS.

In this manner, a GOLS is generated.

Figure 25:
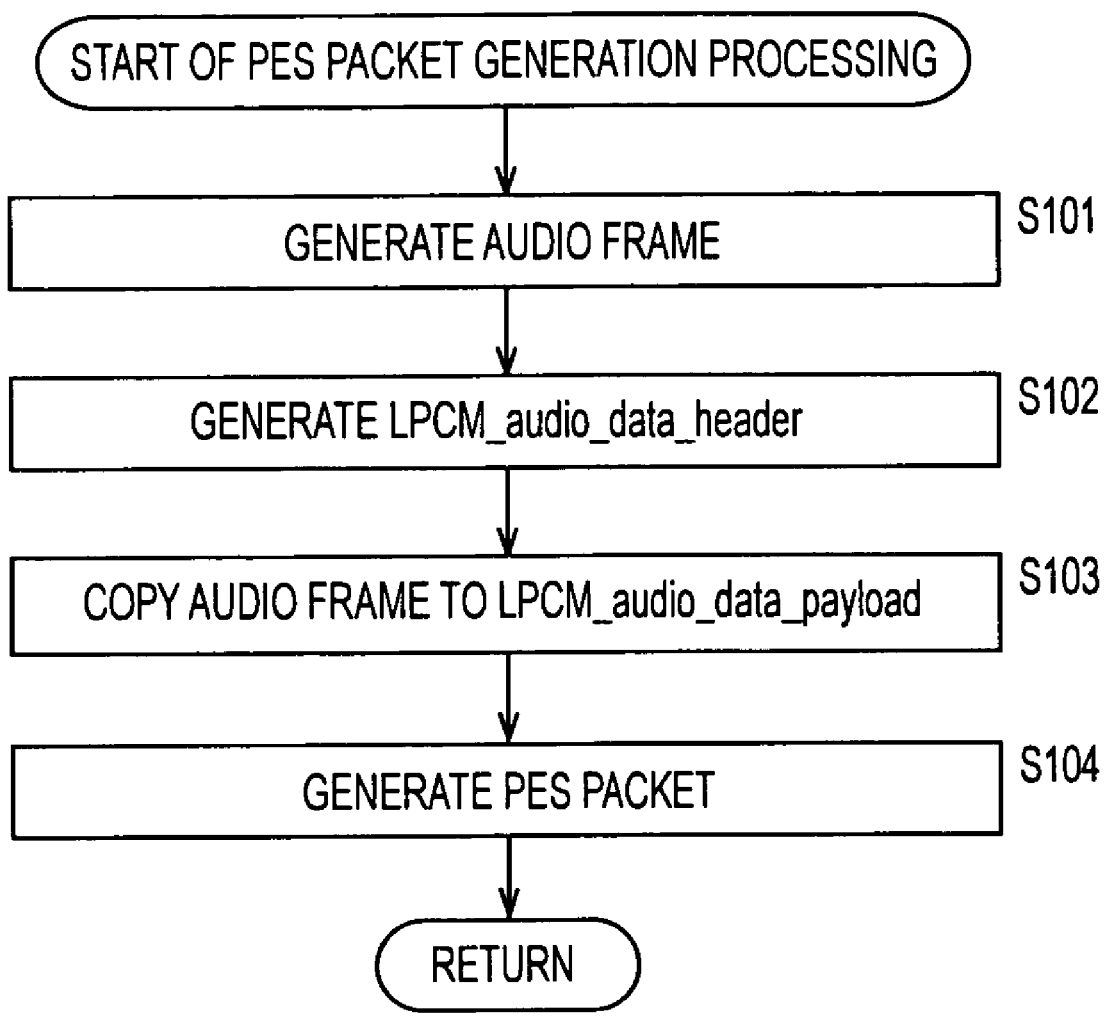
FIG. 25 is a flowchart describing PES packet generation processing.
Figure 26:
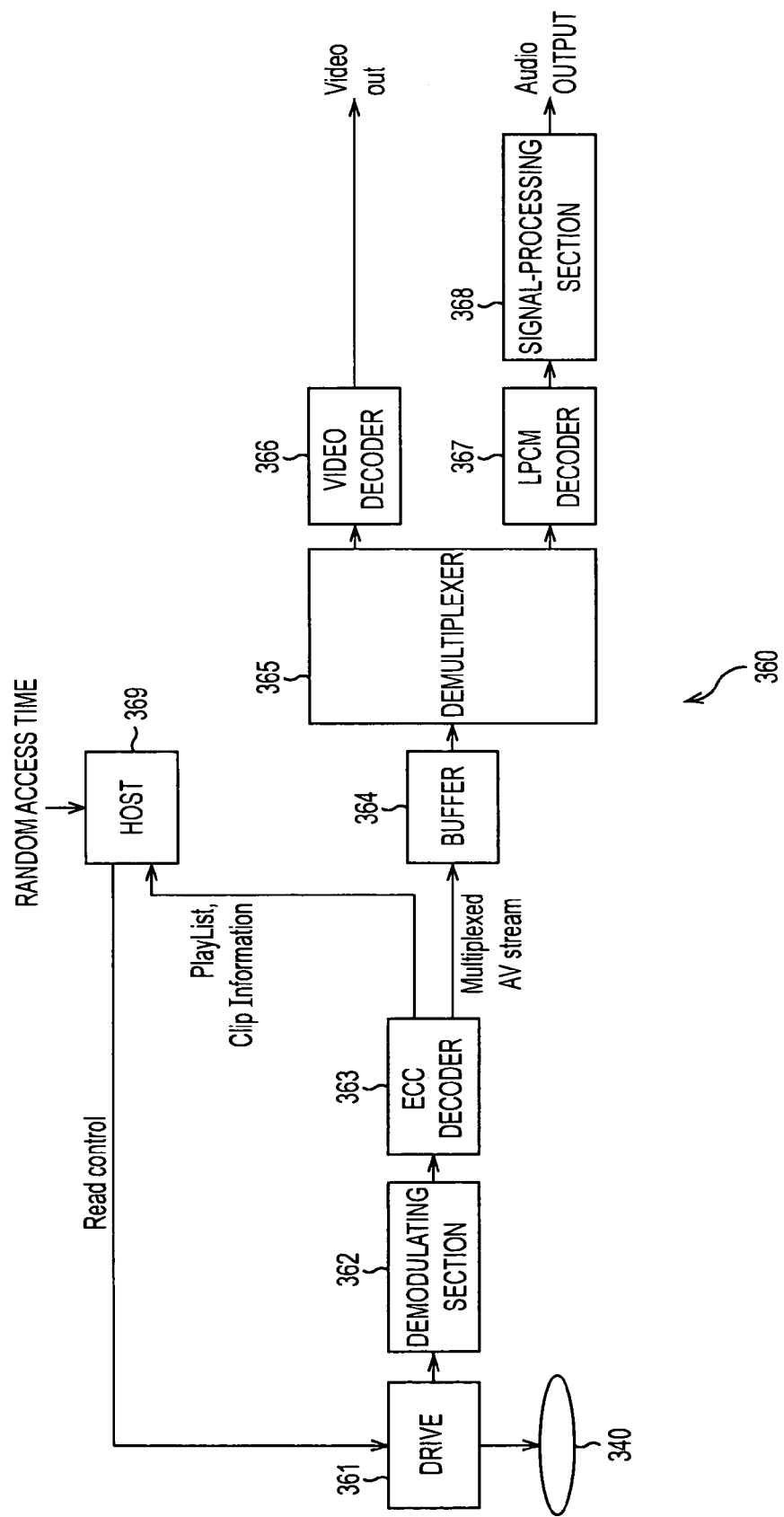
FIG. 26 is a block diagram showing an example structure of a data playback apparatus according to the present invention.

The PES packet generation processing in step S62 of FIG. 23 will now be described with reference to FIG. 25. In step S101, the LPCM encoder 332 collects a predetermined number of GOLS to generate an LPCM_audio_frame. For example, if the sampling period is 48 KHz, 240 GOLS are collected to generate an LPCM_audio_frame.

In step S102, the LPCM encoder 332 generates an LPCM_audio_header. At this time, the value of the field "channel_assignment" is set on the basis of the channel assignment identified in step S21 of FIG. 21, and the value of the field "sampling_frequency" is set on the basis of the sampling frequency identified in step S22. Furthermore, the value of the field "bits_per_sample" is set on the basis of the number of bits per sample identified in step S24, and the value of the field "start_flag" is set on the basis of the track head information identified in step S23.

In step S103, the LPCM encoder 332 copies the LPCM_audio_frame to the LPCM_audio_data_payload. In step S104, the LPCM encoder combines the LPCM_audio_header and the LPCM_audio_data_payload to generate a PESpacketpayload, and addes the PESpacketheader to the PESpacketpayload to generate a PES packet.

In this manner, an audio PES packet is generated.

Figure 20:
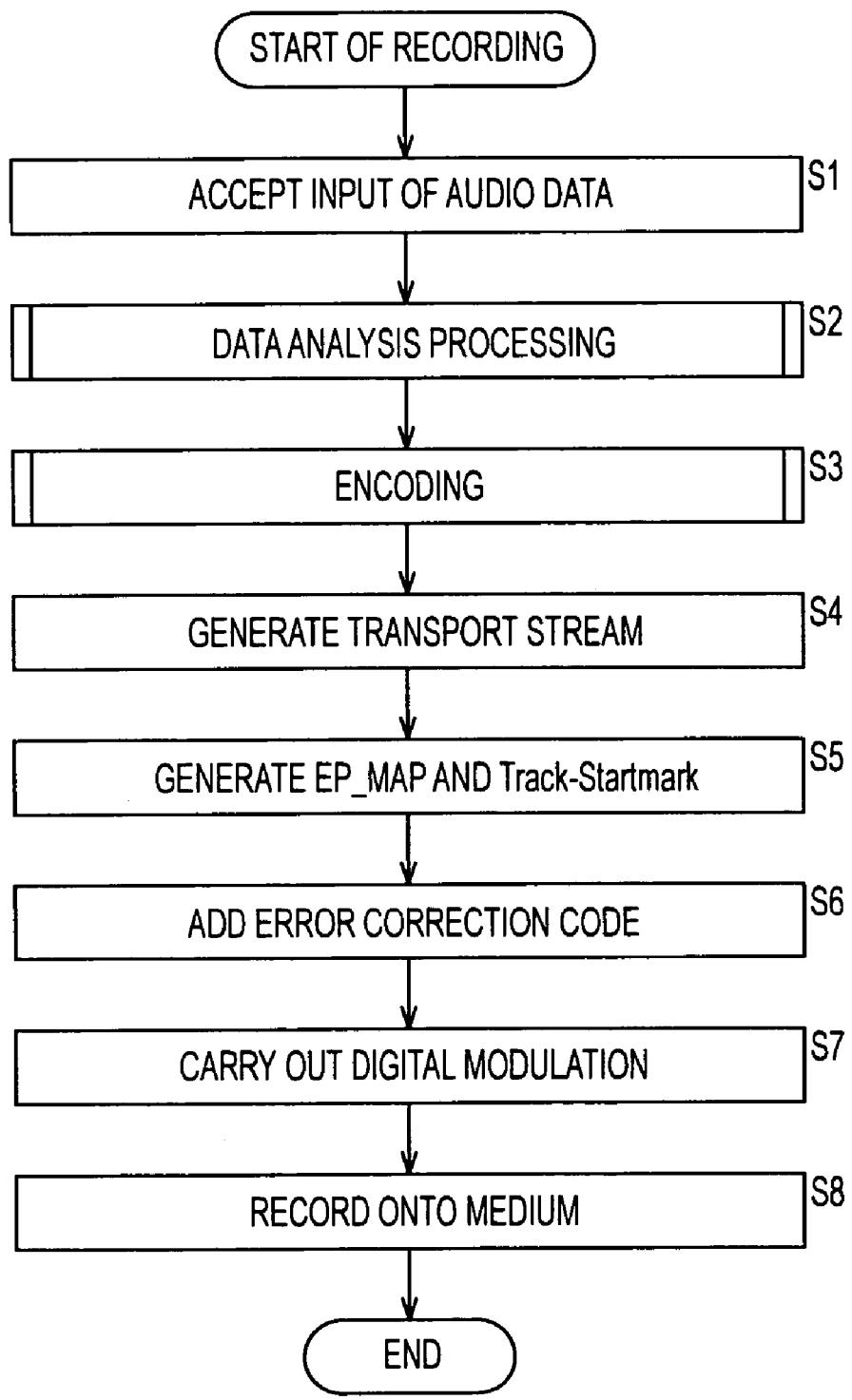
FIG. 20 is a flowchart describing recording by the data recording apparatus in FIG. 19.

FIG. 20 is a block diagram showing an example structure of a data playback apparatus 360 according to the present invention. A medium 340 on which data is recorded by a data recording apparatus according to the present invention is placed in a drive 361, which then reads out the data. A demodulating section 362 demodulates the read-out data and outputs it to an ECC decoder 363. The ECC decoder 363 carries out error correction of the data output from the demodulating section 362, extracts the PLAYLIST and the Clip Information to output to a host 369, and furthermore, outputs an AV stream to a buffer 364.

The host 369 has, for example, a user interface (not shown in the figure) for accepting user's key inputs. Using this user interface, the user specifies playback data by entering, for example, a track number or time. The host 369 controls the drive 361 so that the drive 361 reads out playback data on the basis of the specification by the user.

Data output from the buffer 364 is output to a split section 365, which splits the data into a video PES packet and an audio PES packet. The video PES packet is output to a video decoder 366, which then decodes the video PES packet and outputs video data. The audio PES packet is output to an LPCM decoder 367, which then decodes the audio PES packet and outputs it to a signal-processing section 368. The signal-processing section 368 converts data output from the LPCM decoder 367 to, for example, an IEC 60958-compliant LPCM audio data stream for output.

Figure 27:
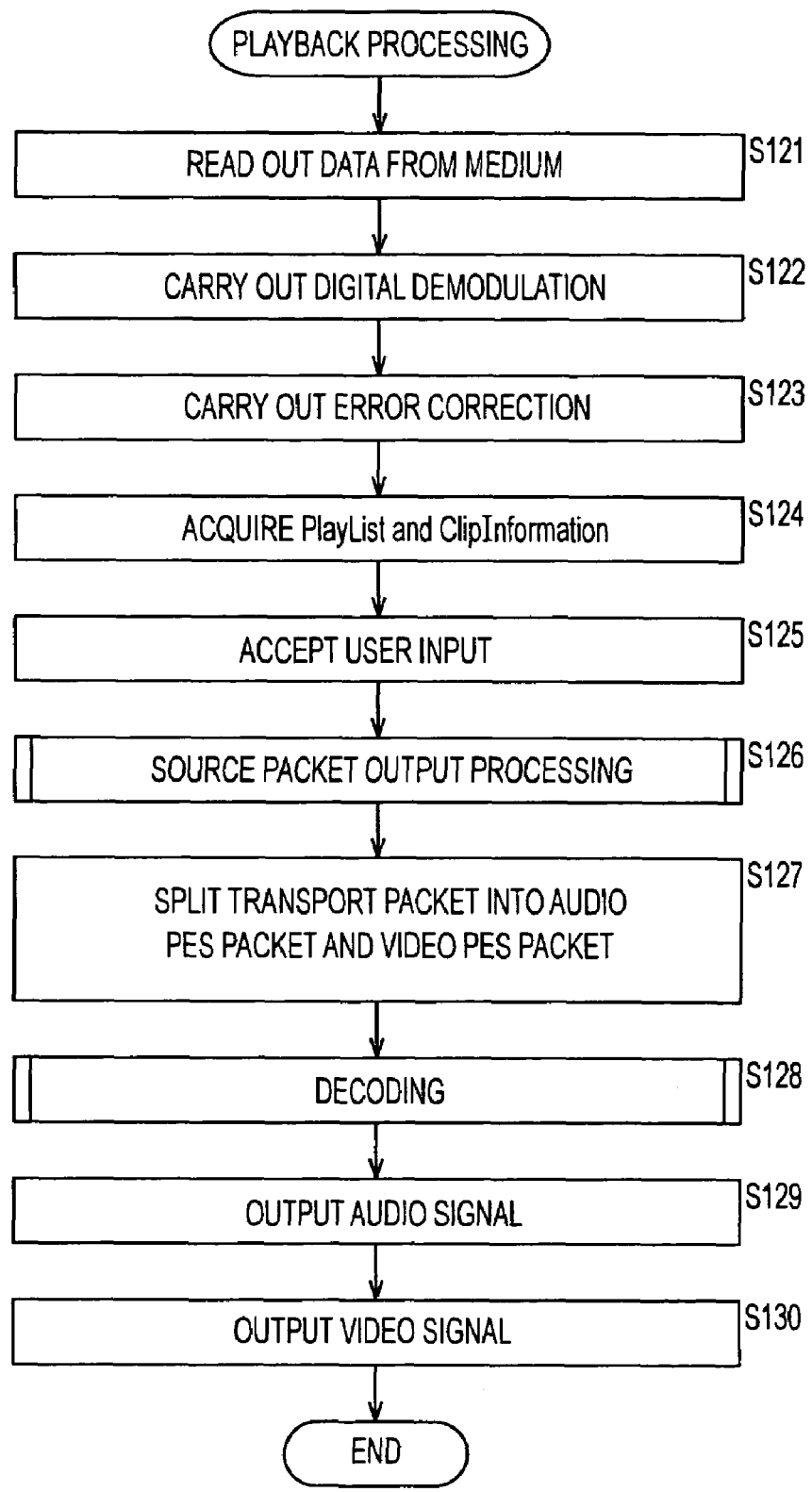
FIG. 27 is a flowchart describing playback processing by the data playback apparatus in FIG. 26.
Figure 28:
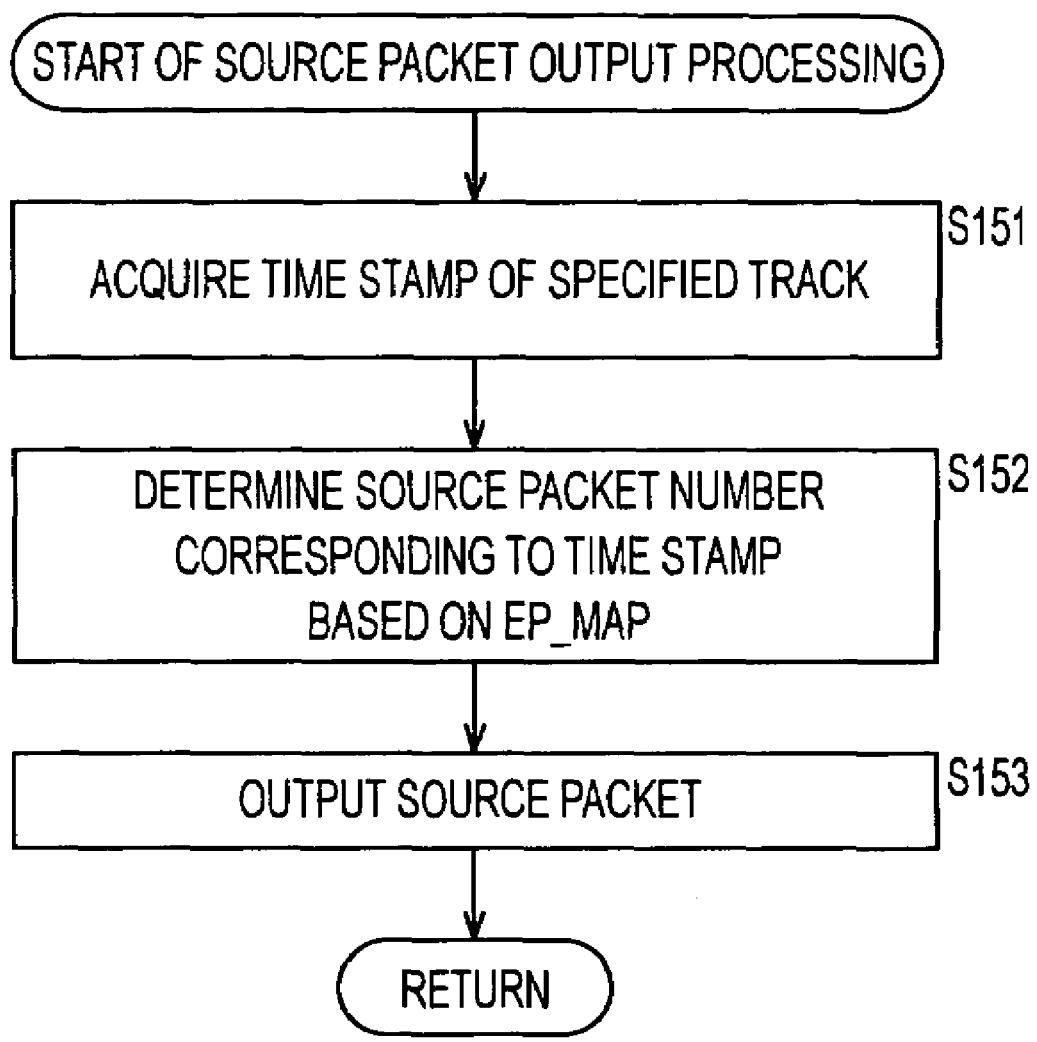
FIG. 28 is a flowchart describing source packet output processing.
Figure 29:
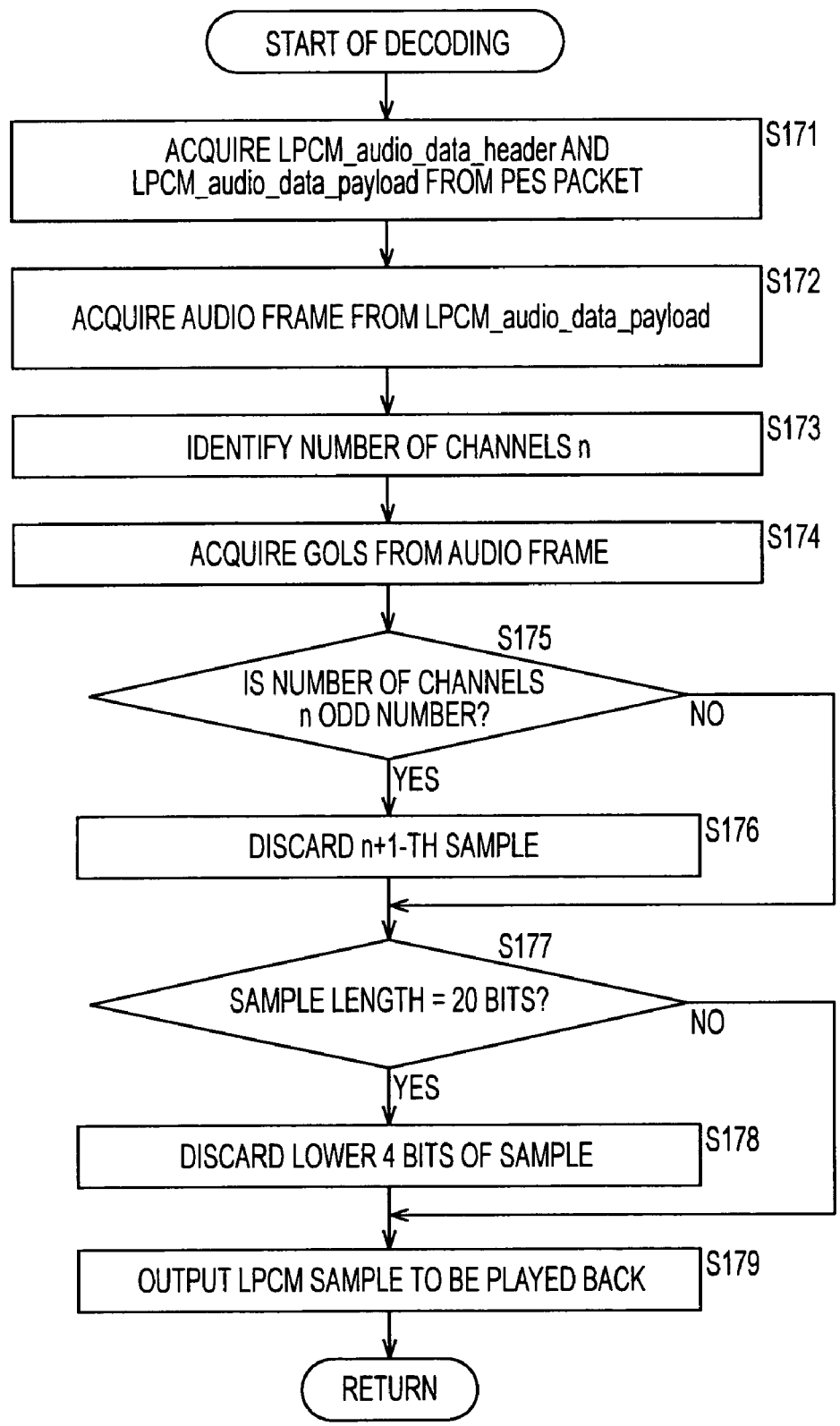
FIG. 29 is a flowchart describing decoding.

The operation of the data playback apparatus 360 will now be described with reference to FIGS. 27 to 29. In step S121, the drive 361 reads out data from the medium 361. In step S122, the demodulating section 362 digitally demodulates the read-out data. In step S123, the ECC decoder 363 carries out error correction. At this time, not only is error correction of data output from the demodulating section 362 carried out, but also the PLAYLIST and the Clip Information are extracted and output to the host 369.

In step S125, the host 369 acquires the PLAYLIST and the Clip Information. In step S125, the host 369 accepts user inputs via the user interface. In step S126, the host 369 carries out source packet output processing to be described below with reference to FIG. 28. As a result, a source packet corresponding to a track (or time) specified by the user is read out from the drive 361. The read-out source packet is digitally demodulated by the demodulating section 362, subjected to error correction by the ECC decoder 363, and then output to the buffer 364 to assemble a transport stream.

In step S127, the split section 365 splits the transport packet of the transport stream into an audio PES packet and a video PES packet. In this case, the audio PES packet is output to the LPCM decoder 367, and the video PES packet is output to the video decoder 366.

In step S128, the LPCM decoder 367 carries out decoding to be described below with reference to FIG. 29. As a result, an LPCM sample to be played back is output.

In step S129, the signal-processing section 368 converts data output from the LPCM decoder 367 to, for example, an IEC 60958-compliant LPCM audio data stream for output.

In step S130, the video decoder 366 decodes the video PES packet and outputs a video signal.

In this manner, data is played back, and data recorded by the data recording apparatus 330 according to the present invention is converted to, for example, an IEC 60958-compliant LPCM audio data stream.

The source packet output processing in step S126 of FIG. 27 will now be described with reference to FIG. 28. In step S151, the host 369 acquires the time stamp corresponding to the track specified by the user. In step S152, the host 369 determines the source packet number corresponding to the time stamp on the basis of the EP_map.

As described above, the EP_map is an address conversion table, in which source packet numbers, serving as addresses, corresponding to time stamps are stored. In step S153, the host 369 has the drive 361 output a source packet.

In this manner, data of the track specified by the user is output.

The decoding in step S128 of FIG. 27 will now be described with reference to FIG. 29.

In step S171, the LPCM decoder 367 acquires an LPCM_audio_data_header and an LPCM_audio_data_payload from the PES packet, and, in step S172, acquires an LPCM_audio_frame from the LPCM_audio_data_payload.

In step S173, the LPCM decoder 367 identifies the number of channels n. At this time, the number of channels n can be identified from the field "channel_assignment" of the LPCM_audio_data_header acquired in step S171. For example, if the value of the field "channel_assignment" is 4, it indicates that the channel configuration of the relevant audio data is L,C,R (3/0), as shown in FIG. 13. In this case, the number of channels n is identified as 3. As described above, according to the present invention, the number of channels is forced to be an even number. More specifically, the data of L,C,R(3/0), which is a channel configuration originally with three (an odd number) channels, is converted to data with four (an even number) channels by assigning data (X) whose values are all 0 as the data of the fourth channel. The number of channels n identified here, however, is the original number of channels on the basis of the channel configuration.

In step S174, the LPCM decoder 367 acquires a GOLS from the LPCM_audio_frame.

In step S175, the LPCM decoder 367 determines whether or not the number of channels n is an odd number. If a determination is made that n is an odd number, the n+1-th sample is discarded. As described above, if the number of channels n is 3, data (X) whose values are all 0 is assigned as the data of the fourth channel. Therefore, the data (sample) is discarded (ignored).

On the other hand, if a determination is made in step S175 that the number of channels n is not an odd number (is an even number), the processing in step S176 is skipped.

In step S177, the LPCM decoder 367 determines whether or not the number of sample bits is equal to 20. In this case, the number of sample bits can be determined by the value of the field "bits_per_sample" of the LPCM_audio_data_header acquired in step S171. As shown in FIG. 16, if the value of the field "bits_per_sample" is 2, the number of bits per sample is identified as 20.

If a determination is made in step S177 that the number of sample bits is equal to 20, the flow proceeds to step S178, where the LPCM decoder 367 discards the lower (LSB-end) 4 bits of the sample. As shown in FIG. 8, according to the present invention, 4 bits of 0 are added to the LSB-end of the 20-bit sample, and hence these 4 bits are discarded (ignored).

On the other hand, if a determination is made in step S177 that the number of sample bits is not equal to 20, the processing in step S178 is skipped.

In step S179, the LPCM decoder 367 outputs an LPCM sample to be played back.

In this manner, an LPCM sample is extracted and output from the PES packet.

It does not matter whether the above-described processing is to be realized with hardware or software. If the above-described series of processing is to be carried out with software, a program constituting the software is installed via a network or from a recording medium into a computer built in dedicated hardware or into, for example, a general-purpose personal computer, as shown in FIG. 30, which can carry out various types of functions by installing various types of programs.

Figure 30:
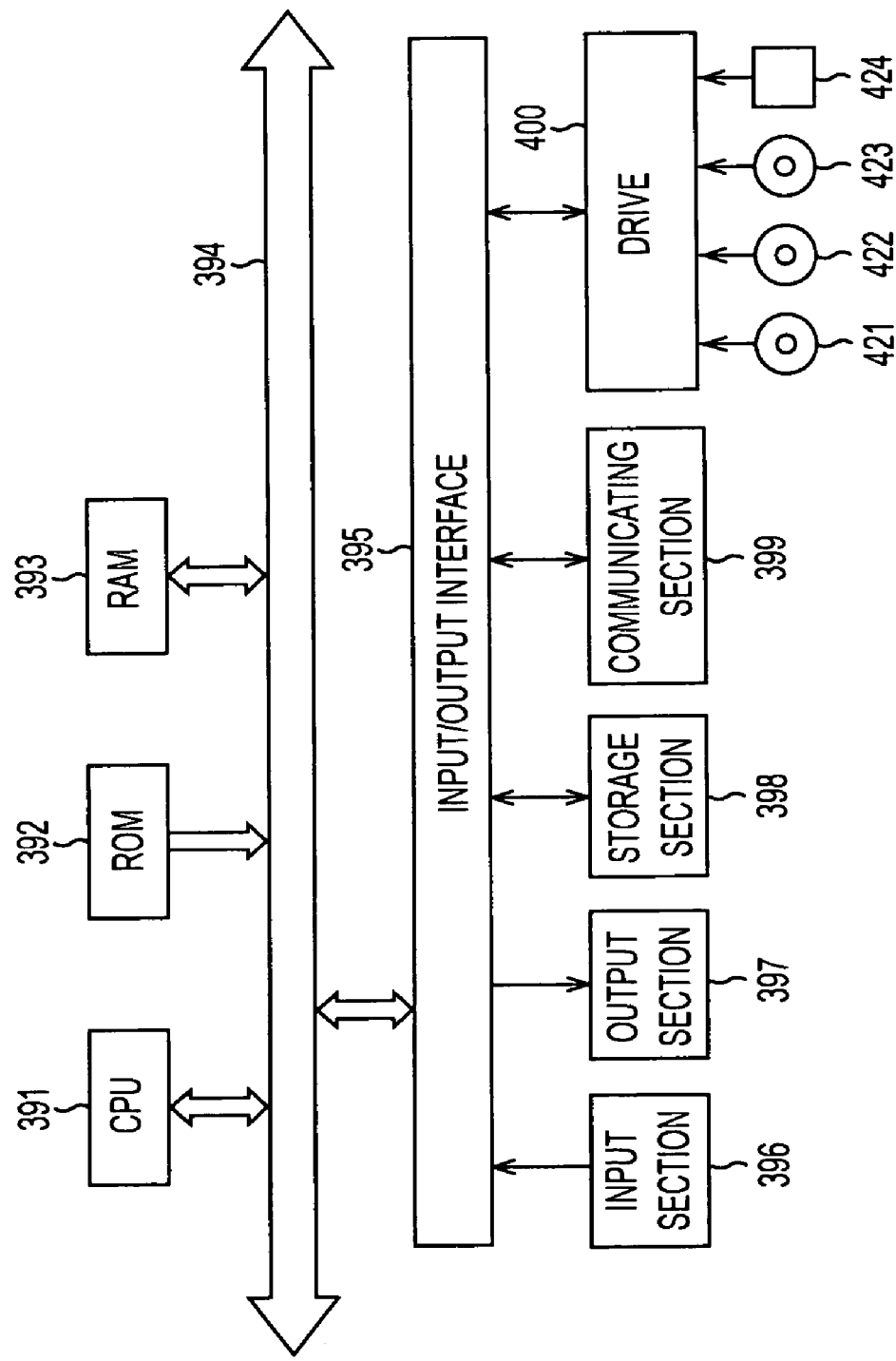
FIG. 30 is a diagram showing an example structure of a personal computer.

In FIG. 30, a CPU (Central Processing Unit) 391 carries out various types of processing according to programs stored in a ROM (Read Only Memory) 392 or programs loaded from a storage section 398 into a RAM (Random Access Memory) 393. Furthermore, data required for the CPU 391 to carry out various types of processing is stored in the RAM 393 as necessary.

The CPU 391, the ROM 392, and the RAM 393 are interconnected via a bus 394. Furthermore, an input/output interface 395 is connected to this bus 394.

An input section 396 including, for example, a keyboard and a mouse; a display section including, for example, a CRT (Cathode Ray Tube) and an LCD (Liquid Crystal display); an output section 397 including, for example, a speaker; the storage section 398 including, for example, a hard disk; and a communicating section 399 including, for example, a modem and a terminal adapter are connected to the input/output interface 395. The communicating section 399 carries out communication processing via a network such as the Internet.

Furthermore, a drive 400 is connected to the input/output interface 395 as required, a recording medium on which a program according to the present invention is recorded is placed in the drive 200, and a computer program read out from them is installed into the storage section 398 as required.

The recording medium is realized by, for example, a magnetic disk 421, an optical disk 422, a magneto-optical disk 423, or a semiconductor memory 424.

The steps for carrying out the series of processing described so far may or may not be followed time-sequentially in order of the steps as described. Instead, the steps may be followed in parallel or independently from one another.

INDUSTRIAL APPLICABILITY

As described above, according to the present invention, audio data can be recorded or played back more easily. In particular, a recording and playback apparatus with a simpler structure can be provided at a lower cost by realizing a recording medium with a data structure of high affinity with the recording and playback apparatus.

The invention claimed is:

1. A data recording apparatus for recording sampled audio data or video data onto a recording medium readable by an information processing apparatus, comprising:
   data analyzing means for analyzing input audio data;
   series-of-samples generating means for generating a series of samples by arranging samples of the audio data which are sampled with the same timing for a plurality of channels in a predetermined order on the basis of an analysis result by the analyzing means;
   element-packet generating means for generating an element packet by generating an audio frame by combining an even number of the series of the samples generated by the series-of-samples generating means such that first respective samples at a first time of the same timing from each of the plurality of channels are combined into a first group of samples and second respective samples at a second time of the same timing from each of the plurality of channels are combined into a second group of samples, and by adding header information including: (1) data indicating a channel configuration, (2) data indicating the number of sample bits, and (3) data indicating a sampling period to the audio frame;
   wherein the element packet can have a variable number of channel configurations of a variable number of odd or even channel configurations assigned for a plurality of channels;
   wherein the number of channels is an even number, and in each instance when the data indicating a channel configuration indicates an odd number of channels, a last channel is assigned data of all values 0, to convert the channel configuration to an even number of channels; and
   transmission-packet generating means for generating a transmission packet by splitting the element packet generated by the element-packet generating means into transmission packets composed of a predetermined number of bits.

2. The data recording apparatus according to claim 1, wherein the series-of-samples generating means includes:
   sample-inserting means for inserting a pseudo sample with the same number of bits as those of the samples and a predetermined pattern of the bits after the sample which is sampled for the last channel of the plurality of channels,
   if the number of channels is determined to be an odd number by the analyzing means.

3. The data recording apparatus according to claim 1, wherein the analyzing means includes sample-converting means for adding a predetermined pattern of 4bits to the samples if the number of bits of the samples is 20.

4. The data recording apparatus according to claim 1, wherein the samples are samples of audio data which are sampled by a linear PCM method.

5. The data recording apparatus according to claim 1, wherein the element-packet generating means generates the element packet by storing track head information in the header information of the element packet.

6. The data recording apparatus according to claim 1, wherein each element packet contains only one audio frame.

7. The data recording apparatus according to claim 1, wherein the header information further includes: (4) one-bit data indicating whether a relevant element packet is a start point of an audio track or not, a first value of the one-bit data indicating the relevant element packet is a start point of the audio track, and a second value of the one-bit data indicating the relevant element packet is not a start point of the audio track, wherein a number of bits for each audio frame is an integer multiple of 32.

8. A data recording apparatus according to claim 1, wherein the audio data is readable by the information processing apparatus by accessing clip information recorded in the data area and including an entry point map, and further comprising:
   means for generating the entry point map, which is an address conversion table mapping time stamps to corresponding addresses of the audio data, and for generating, based on the entry point map, the clip information to convert a time stamp in the audio data to an address of the audio data.

9. A data recording method by a data recording apparatus for recording sampled audio data or video data onto a recording medium readable by an information processing apparatus, the method comprising:
   analyzing input audio data;
   generating a series of samples by arranging samples of the audio data which are sampled with the same timing for a plurality of channels in a predetermined order on the basis of an analysis result in the analyzing;
   generating an element packet by generating an audio frame by combining an even number of the series of the samples generated in the series-of-samples generating such that first respective samples at a first time of the same timing from each of the plurality of channels are combined into a first group of samples and second respective samples at a second time of the same timing from each of the plurality of channels are combined into a second group of samples, and by adding header information including: (1) data indicating a channel configuration, (2) data indicating the number of sample bits, and (3) data indicating a sampling period to the audio frame;
   wherein the element packet can have a variable number of channel configurations of a variable number of odd or even channels, and further comprising assigning one of the variable odd or even channel configurations for a plurality of channels;
   wherein the number of channels is an even number, and in each instance when the data indicating a channel configuration indicates an odd number of channels, a last channel is assigned data of all values 0, to convert the channel configuration to an even number of channels; and
   generating a transmission packet by splitting the element packet generated in the element-packet generating into transmission packets composed of a predetermined number of bits.

10. The data recording method according to claim 9, wherein each element packet contains only one audio frame.

11. The data recording method according to claim 9, wherein the header information further includes: (4) one-bit data indicating whether a relevant element packet is a start point of an audio track or not, a first value of the one-bit data indicating the relevant element packet is a start point of the audio track, and a second value of the one-bit data indicating the relevant element packet is not a start point of the audio track, wherein a number of bits for each audio frame is an integer multiple of 32.

12. A data recording method according to claim 9, wherein the audio data is readable by the information processing apparatus by accessing clip information recorded in the data area and including an entry point map, and further comprising:

generating the entry point map, which is an address conversion table mapping time stamps to corresponding addresses of the audio data, and generating, based on the entry point map, the clip information to convert a time stamp in the audio data to an address of the audio data.

* * * * *